United States Patent
Kashiwagi et al.

(10) Patent No.: US 10,131,302 B2
(45) Date of Patent: Nov. 20, 2018

(54) AIRBAG SENSOR ATTACHMENT STRUCTURE

(71) Applicant: HONDA MOTOR CO., LTD., Tokyo (JP)

(72) Inventors: Masakazu Kashiwagi, Wako (JP); Hajime Ohya, Wako (JP); Yu Saito, Wako (JP); Hiroshi Ohtake, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/439,347

(22) Filed: Feb. 22, 2017

(65) Prior Publication Data

US 2017/0240128 A1    Aug. 24, 2017

(30) Foreign Application Priority Data

Feb. 22, 2016    (JP) .................................. 2016-031158

(51) Int. Cl.
*B60R 19/48*    (2006.01)
*B60R 11/00*    (2006.01)
(Continued)

(52) U.S. Cl.
CPC .............. *B60R 19/48* (2013.01); *B60R 11/00* (2013.01); *B60R 11/0264* (2013.01); *B60R 19/18* (2013.01); *B60R 21/0136* (2013.01); *B60R 2011/004* (2013.01); *B60R 2021/01006* (2013.01)

(58) Field of Classification Search
CPC ..... B60R 19/48; B60R 11/0264; B60R 11/00; B60R 21/0136; B60R 19/18; B60R 2021/01006; B60R 2011/004
See application file for complete search history.

(56) References Cited

U.S. PATENT DOCUMENTS

| | | | | |
|---|---|---|---|---|
| 6,056,337 A | * | 5/2000 | Oguri | ...................... B60R 19/12 293/132 |
| 7,137,472 B2 | * | 11/2006 | Aoki | ................... B60R 21/0136 180/274 |

(Continued)

FOREIGN PATENT DOCUMENTS

| | | |
|---|---|---|
| JP | 5-112195 A | 5/1993 |
| JP | 5-330399 A | 12/1993 |

(Continued)

OTHER PUBLICATIONS

Office Action dated Dec. 15, 2017, issued in counterpart Japanese Application No. 2016-031158, with English machine translation. (23 pages).

*Primary Examiner* — Darlene P Condra
(74) *Attorney, Agent, or Firm* — Westerman, Hattori, Daniels & Adrian, LLP

(57) ABSTRACT

A vehicle body front section structure is provided with a sensor attachment structure to an outside face of a left bumper beam extension. The sensor attachment structure includes a support section provided on the outside face of the left bumper beam extension, and an airbag sensor attached to the support section. The support section deforms and retreats toward the vehicle body rear as a result of compression of the left bumper beam extension during compression of the left bumper beam extension due to an impact load input from the vehicle body front.

18 Claims, 13 Drawing Sheets

(51) Int. Cl.
  *B60R 19/18*    (2006.01)
  *B60R 21/0136*  (2006.01)
  *B60R 11/02*    (2006.01)
  *B60R 21/01*        (2006.01)

(56) References Cited

U.S. PATENT DOCUMENTS

| | | | |
|---|---|---|---|
| 9,586,546 B2* | 3/2017 | Matsuo | B60R 19/18 |
| 2005/0200139 A1* | 9/2005 | Suzuki | B60R 21/0136 |
| | | | 293/117 |
| 2006/0220808 A1* | 10/2006 | Takahashi | B60R 21/0136 |
| | | | 340/436 |
| 2009/0306857 A1* | 12/2009 | Katz | B60R 21/0136 |
| | | | 701/45 |
| 2010/0259033 A1* | 10/2010 | Okabe | B60R 19/34 |
| | | | 280/734 |
| 2017/0136970 A1* | 5/2017 | Steinebach | B60R 19/34 |

FOREIGN PATENT DOCUMENTS

| | | | |
|---|---|---|---|
| JP | 11-129838 A | 5/1999 | |
| JP | 2000-313305 A | 11/2000 | |
| JP | 2001-88637 A | 4/2001 | |
| JP | 3690232 B2 | 8/2005 | |
| JP | 2009-514735 A | 4/2009 | |
| JP | 2010-125884 A | 6/2010 | |
| JP | 2011-194989 A | 10/2011 | |
| WO | WO-2015080037 A1 * | 6/2015 | B60R 19/03 |

\* cited by examiner

AIRBAG SENSOR ATTACHMENT STRUCTURE

CROSS REFERENCES TO RELATED APPLICATIONS

The present application claims priority under 35 U.S.C. § 119 to Japanese Patent Application No. 2016-031158, filed Feb. 22, 2016, entitled "Airbag Sensor Attachment Structure." The contents of this application are incorporated herein by reference in their entirety.

TECHNICAL FIELD

The present disclosure relates to an airbag sensor attachment structure that is provided on a bumper beam extension at a front end of a front side frame and that attaches an airbag sensor to the bumper beam extension.

BACKGROUND

In a known airbag sensor attachment structure, a crash box (referred to below as a "bumper beam extension") is provided at a front end portion of a front side frame, and an airbag sensor is attached to a front wall of the bumper beam extension inside the bumper beam extension (for example, see Japanese Unexamined Patent Application Publication No. 5-112195).

In the airbag sensor attachment structure in Japanese Unexamined Patent Application Publication No. 5-112195, the airbag sensor is housed inside the bumper beam extension, thereby enabling working space to be secured for assembly of a bumper beam or the like to a front end portion of the front side frame.

Moreover, in a full overlap frontal collision or an offset collision, for example, the bumper beam extension undergoes compression (namely, axial crushing), and the airbag sensor moves toward the vehicle body rear. This enables detection of the full overlap frontal collision or the offset collision by the airbag sensor.

However, in the airbag sensor attachment structure in Japanese Unexamined Patent Application Publication No. 5-112195, the airbag sensor is housed inside the bumper beam extension. Accordingly, the full overlap frontal collision or offset collision cannot be detected by the airbag sensor until the bumper beam extension has been compressed. It is therefore difficult for the airbag sensor to detect a collision at an early stage, during an initial stage of a full overlap frontal collision or offset collision.

In another known airbag sensor attachment structure, a flange of a bumper beam extension is provided to a flange at a front end portion of a front side frame, and an airbag sensor is attached to the flange of the bumper beam extension (see, for example, Japanese Patent No. 3690232).

In the airbag sensor attachment structure of Japanese Patent No. 3690232, in a full overlap frontal collision or an offset collision, for example, the bumper beam extension is compressed, enabling detection of the full overlap frontal collision or the offset collision by the airbag sensor.

However, in the airbag sensor attachment structure of Japanese Patent No. 3690232, the airbag sensor is attached to the flange of the bumper beam extension (namely, a base portion of the bumper beam extension). It is accordingly difficult for the airbag sensor to detect a collision at an early stage during an initial stage of a full overlap frontal collision or offset collision.

SUMMARY

A conceivable countermeasure to this issue would be to provide a bracket extending forward from the flange toward the vehicle body front, as far as a front wall of the bumper beam extension, and to attach the airbag sensor to the bracket.

However, if a bracket were to be extended from the flange as far as the front wall of the bumper beam extension, the bracket would have a large length dimension. Since the airbag sensor would be supported in a cantilevered state at a leading end portion of the bracket, the airbag sensor would be susceptible to vibration during vehicle travel, leading to the possibility of detection not being possible, or of making erroneous detection.

Moreover, a bracket with a long length dimension would be required in order to support the airbag sensor, leading to an increase in components and an increase in weight.

The present disclosure provides, for example, an airbag sensor attachment structure capable of detecting a collision precisely and at an early stage using an airbag sensor.

A first aspect of the disclosure describes an airbag sensor attachment structure for attachment to a vehicle body front section structure including a front side frame extending in a vehicle body front-rear direction and a bumper beam extension extending out from a front end of the front side frame toward the vehicle body front at both front side sections of a vehicle body, and a bumper beam provided at a front end of the bumper beam extensions. The airbag sensor attachment structure includes: a support section that is provided at an external face of the bumper beam extension, and that retreats toward the vehicle body rear accompanying compression of the bumper beam extension during compression of the bumper beam extension due to an impact load input from the vehicle body front; and an airbag sensor that is attached to the support section.

As described above, the support section is provided on the external face of the bumper beam extension, and the airbag sensor (namely, a frontal collision sensor) is attached to the support section.

Note that in a light collision in a low speed range in which it is not necessary to deploy an airbag (namely, light frontal collisions), the bumper beam undergoes bending and crushing defamation to absorb impact load. On the other hand, the bumper beam extension has strength and rigidity against light collisions, and there is little compression (namely, axial crushing) of the bumper beam extension.

Accordingly, in a light collision, movement of the airbag sensor toward the vehicle body rear is suppressed, enabling the airbag sensor to be prevented from detecting a light collision unnecessarily and deploying the airbag.

Moreover, for example, in an offset collision at a lower limit of the speed for actuating the airbag (specifically, in an intermediate speed range), the front end of the bumper beam extension intrudes into a comparatively soft material part of a frontmost section of a counterpart vehicle in an initial stage of the collision. The comparatively soft material part of the counterpart vehicle impinges on the support section such that the support section retreats toward the vehicle body rear.

Accordingly, the airbag sensor retreats toward the vehicle body rear together with the support section, enabling collision information required for airbag deployment to be detected precisely and at an early stage by the airbag sensor. This thereby enables the airbag to be deployed in an initial stage of the offset collision.

Note that an offset collision is a collision in which part of the front section of the vehicle (approximately half of the width of the front of the vehicle body) collides with an obstacle such as another vehicle.

Moreover, for example, in a full overlap frontal collision in a high speed range (referred to below as a high speed frontal collision), or in a small overlap collision, sufficient to fully crush the bumper beam extension over its entire range, the bumper beam extension can undergo compression (namely, axial crushing) due to the impact load input from the vehicle body front. When this occurs, the support section can be made to retreat toward the vehicle body rear due to compression of the bumper beam extension.

The airbag sensor can accordingly be made to retreat toward the vehicle body rear together with the support section. This thereby enables collision information to be detected precisely and at an early stage by the airbag sensor in a high speed frontal collision or a small overlap collision.

In a second aspect of the disclosure, configuration may preferably be made in which the support section includes: a stay that includes a front joining portion and a rear joining portion provided on the external face of the bumper beam extension, and that is famed in a substantially hat-shape in plan view; and a bracket that includes an attachment base portion provided to the stay at an apex portion of the stay separated from the external face of the bumper beam extension, and a projecting portion projecting out from the attachment base portion and to which the airbag sensor is attached. The bracket is formed in a substantially L-shape in plan view by the attachment base portion and the projecting portion.

As described above, the stay of the support section is famed in a substantially hat-shape in plan view. The front joining portion and the rear joining portion of the stay are provided on the external face of the bumper beam extension. The strength and rigidity of the stay can accordingly be raised. Moreover, since the stay is famed in a substantially hat-shape in plan view, the apex portion of the stay can be separated from the external face of the bumper beam extension.

The attachment base portion of the bracket is provided to the apex portion of the stay, and the projecting portion projects out from the attachment base portion. This thereby enables a projection amount (extension amount) of the projecting portion to be kept small. The airbag sensor is attached to the projecting portion that has a small projection amount.

Accordingly, the characteristic vibration value (resonance frequency) of the support section can be raised in a state in which the airbag sensor is supported by the support section, enabling the anti-noise performance (anti-vibration performance) of the airbag sensor to be improved. This thereby enables the collision information required for airbag deployment to be detected precisely and at an early stage by the airbag sensor.

In a third aspect of the disclosure, configuration may preferably be made in which the bracket is famed from sheet steel.

Note that it is conceivable that the bracket (namely, the projecting portion) could hit a counterpart vehicle in an offset collision. The bracket is therefore famed from sheet steel. This thereby enables a bending state of the projecting portion with respect to impact load input to the projecting portion to be regulated (controlled) easily when the projecting portion of the bracket hits the counterpart vehicle.

In a fourth aspect of the disclosure, configuration may preferably be made in which the bumper beam extension and the stay are formed from an aluminum alloy. The bracket is fastened to the stay by a fastening member; and the fastening member is coated against galvanic corrosion.

As described above, the bumper beam extension and the stay are formed from an aluminum alloy, and the fastening member (such as a bolt or rivet) is coated against galvanic corrosion. The steel bracket is fastened to the stay by the fastening member. Galvanic corrosion between the stay and the fastening member can accordingly be suppressed, enabling the durability of the stay and the fastening member to be raised.

In a fifth aspect of the disclosure, configuration may preferably be made in which the bumper beam is formed with a hollow cross-section, and a rear portion at both end portions of the bumper beam is fixed to a front end of the bumper beam extension. The bumper beam extension is secured with strength and rigidity against a light collision.

As described above, the bumper beam is famed with a hollow cross section, and the rear portion at both end portions of the bumper beam is fixed to the front end of the bumper beam extension. Moreover, the strength and rigidity of the bumper beam extension are secured against light collisions (namely, in a low speed range in which it is not necessary to deploy an airbag). The bumper beam thereby undergoes bending and crushing deformation to absorb impact load in a light collision.

On the other hand, compression (namely, axial crushing) of the bumper beam extension is suppressed, enabling movement of the airbag sensor toward the vehicle body rear to be suppressed. This thereby enables the airbag sensor to be prevented from detecting a light collision unnecessarily and deploying the airbag.

In a sixth aspect of the disclosure, configuration may preferably be made in which the bumper beam is formed with a hollow cross-section, and a rear portion at both end portions of the bumper beam is fixed to a front end of the bumper beam extension. The bumper beam extension is secured with rigidity against a light collision, and the front joining portion and the rear joining portion of the stay are provided on the external face of the bumper beam extension at a spacing between each other in the vehicle body front-rear direction.

As described above, the bumper beam is famed with a hollow cross section, and the rear portion at both end portions of the bumper beam is fixed to the front end of the bumper beam extension. Moreover, the strength and rigidity of the bumper beam extension are secured against a light collision (namely, in the low speed range in which it is not necessary to deploy the airbag). The bumper beam thereby undergoes bending and crushing defamation to absorb impact load in a light collision.

On the other hand, compression (namely, axial crushing) of the bumper beam extension is suppressed, enabling movement of the airbag sensor toward the vehicle body rear to be suppressed. This thereby enables the airbag sensor to be prevented from detecting a light collision unnecessarily and deploying the airbag.

Moreover, the front joining portion and the rear joining portion of the stay are provided on the external face of the bumper beam extension at a spacing between each other in the vehicle body front-rear direction. Namely, the strength and rigidity of the stay in the direction in which the bumper beam extension is compressed are kept appropriately low. This thereby enables the front joining portion of the stay to move toward the vehicle body rear during compression of the bumper beam extension toward the vehicle body rear due to a high speed frontal collision sufficient to fully crush the bumper beam extension over its entire range.

Accordingly, the bumper beam extension can be stably compressed toward the vehicle body rear, and the front side frame can be stably deformed, without compression (crushing defamation) of the bumper beam extension being obstructed by the stay. This thereby enables the airbag sensor to be made to retreat toward the vehicle body rear accompanying compression of the bumper beam extension, and enables collision information to be detected precisely and at an early stage by the airbag sensor.

In a seventh aspect of the disclosure, configuration may preferably be made in which the bracket includes: a flange that is formed at an upper end or a lower end of the bracket so as to be continuous to the attachment base portion, the projecting portion, and a bend portion where the attachment base portion and the projecting portion intersect; and a connector protector that protrudes out from the upper end or the lower end of the bracket.

As described above, the flange is formed at the upper end or the lower end of the bracket. The strength and rigidity of the bracket can accordingly be raised by the flange. This thereby enables the characteristic resonance value of the bracket to be raised, enabling the anti-noise performance (anti-vibration performance) of the airbag sensor to be improved.

Moreover, the connector protector protrudes out from the upper end or the lower end of the bracket. This thereby enables a wire harness of the airbag sensor to be protected by the connector protector, even when the airbag sensor is provided in a range intruded into by a colliding object. This thereby enables the cutting of the connection of the wire harness to the airbag sensor to be prevented.

In an eighth aspect of the disclosure, configuration may preferably be made in which the airbag sensors are respectively attached to the bumper beam extension on a left side of the vehicle body and to the bumper beam extension on a right side of the vehicle body; and the left side airbag sensor and the right side airbag sensor are inclined such that a distance from the left side airbag sensor to a vehicle body center, and a distance from the right side airbag sensor to the vehicle body center, are the same as each other.

In this manner, the left side airbag sensor and the right side airbag sensor can be configured using common components, thereby enabling costs to be suppressed.

Moreover, the left side airbag sensor and the right side airbag sensor are inclined. Accordingly, the wire harnesses connected to the respective airbag sensors can be brought closer to the side of the respective stays. This thereby enables the connector protectors to be brought closer to the side of the respective stays, enabling the characteristic vibration values of the respective support sections to be raised. Accordingly, resonance of the airbag sensors is suppressed, thereby enabling erroneous detection by the airbag sensors to be prevented.

Moreover, the height of the respective airbag sensors can be kept low due to inclining the left side airbag sensor and the right side airbag sensor. This thereby enables spaces to be secured above the respective airbag sensors. This enables an increase in the degree of freedom in the layout when placing surrounding components (headlights, cooling pipes, and small lights such as fog lamps). This moreover enables any effect on the performance of the surrounding components to be kept small.

Moreover, the distance from each airbag sensor to the vehicle body center is made the same by inclining the left side airbag sensor and the right side airbag sensor. This thereby enables a discrepancy in detection between the left side airbag sensor and the right side airbag sensor to be suppressed from arising in a high speed frontal collision. This thereby enables a collision mode to be accurately determined in a high speed frontal collision.

In a ninth aspect of the disclosure, configuration may preferably be made in which the bumper beam extension has a substantially rectangular shaped external cross-section, has a width dimension famed larger than a height dimension, and is internally partitioned into plural closed cross-sections.

As described above, the width dimension of the bumper beam extension is large, and the bumper beam extension is internally partitioned into plural closed cross-sections (namely, small compartments). The strength and rigidity of the bumper beam extension can accordingly be raised appropriately. This thereby enables compression (namely, axial crushing) of the bumper beam extension in a light collision to be suppressed.

However, in a high speed frontal collision sufficient to fully crush the bumper beam extension over its entire range, the bumper beam extension is capable of undergoing compression (namely, axial crushing) due to the impact load, enabling the energy absorption amount to be increased.

In a tenth aspect of the disclosure, configuration may preferably be made further including an upper member provided at a vehicle width direction outside of the front side frame, and a coupling section that couples a front portion of the upper member and a front portion of the front side frame together. The bumper beam extension is provided at a front end of the front side frame and at a front end of the coupling section.

As described above, the front portion of the upper member is coupled to the front portion of the front side frame by the coupling section. Moreover, the bumper beam extension is provided at the front end of the front side frame and at the front end of the coupling section.

Accordingly, in a small overlap collision, for example, the impact load can be supported by both the front side frame and the upper member. The bumper beam extension can thus undergo adequate compression (namely, axial crushing) due to the impact load, and the airbag sensor can be made to retreat toward the vehicle body rear together with the bumper beam extension. This thereby enables collision information to be detected precisely and at an early stage by the airbag sensor in a small overlap collision.

Note that a small overlap collision is a collision in which a front section of the vehicle collides with an obstacle such as a vehicle, tree, or electricity pole at a front side portion at the outside of the front side frame at ¼ in the vehicle width direction. Note that small overlap collisions are also referred to as narrow offset collisions.

BRIEF DESCRIPTION OF THE DRAWINGS

The advantages of the disclosure will become apparent in the following description taken in conjunction with the following drawings.

DETAILED DESCRIPTION

Figure 1:
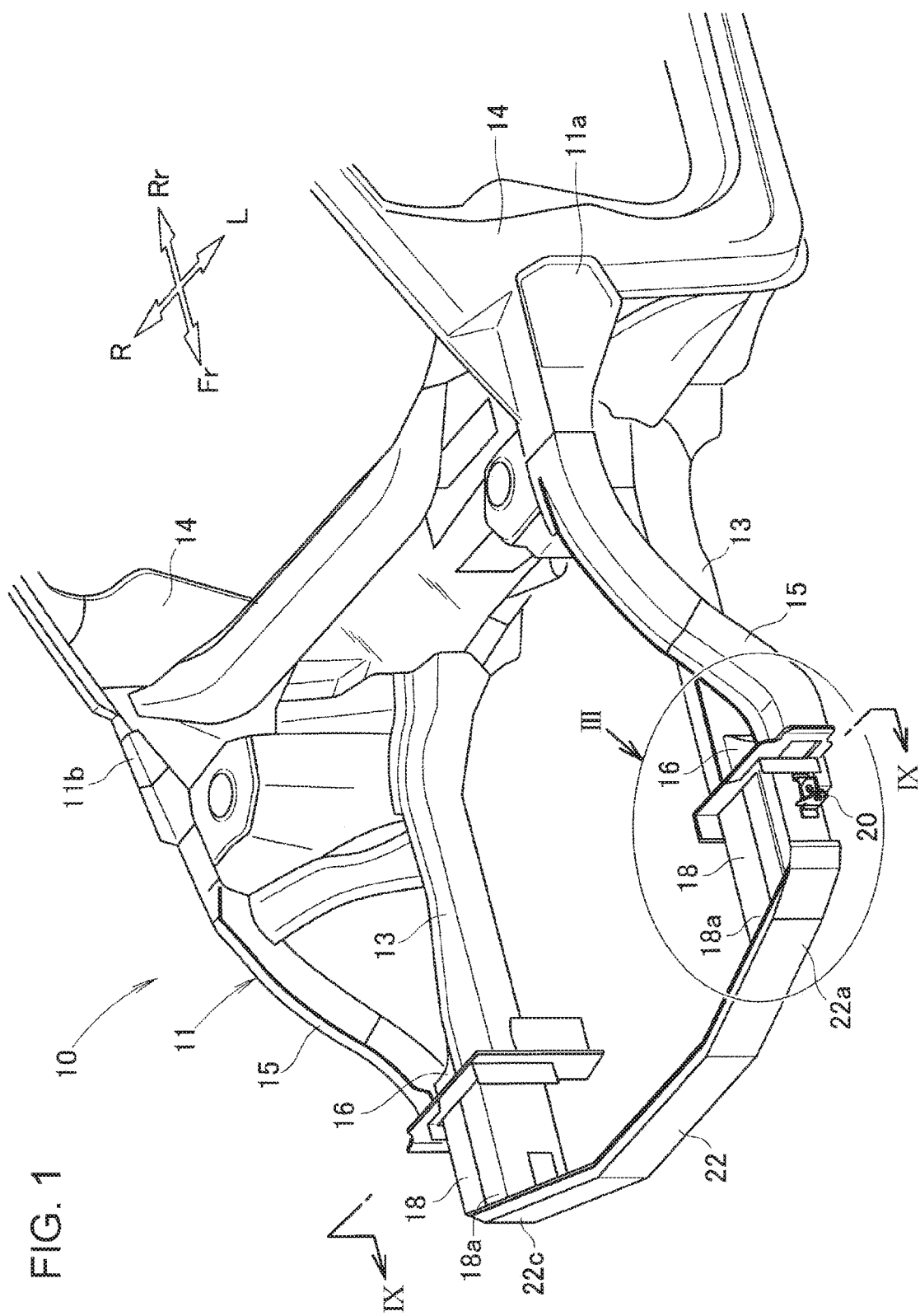
FIG. 1 is a perspective view illustrating a vehicle body front section structure provided with an airbag sensor attachment structure according to an embodiment of the present disclosure.

Explanation follows regarding a preferred embodiment of the present disclosure, with reference to the attached drawings. "Front (Fr)", "Rear (Rr)", "Left (L)", "Right (R)" are directions seen from the perspective of a driver.

Embodiment

Explanation follows regarding an airbag sensor attachment structure 20 according to an embodiment. The airbag sensor attachment structure 20 is abbreviated to "sensor attachment structure 20" below.

A vehicle body front section structure 10 is configured with substantially left-right symmetry. In the following explanation, the same reference numerals are allocated to configuration members on the left side and configuration members on the right side. Detailed explanation is given regarding the configuration members on the left side, with explanation regarding the configuration members on the right side being omitted.

Figure 2:
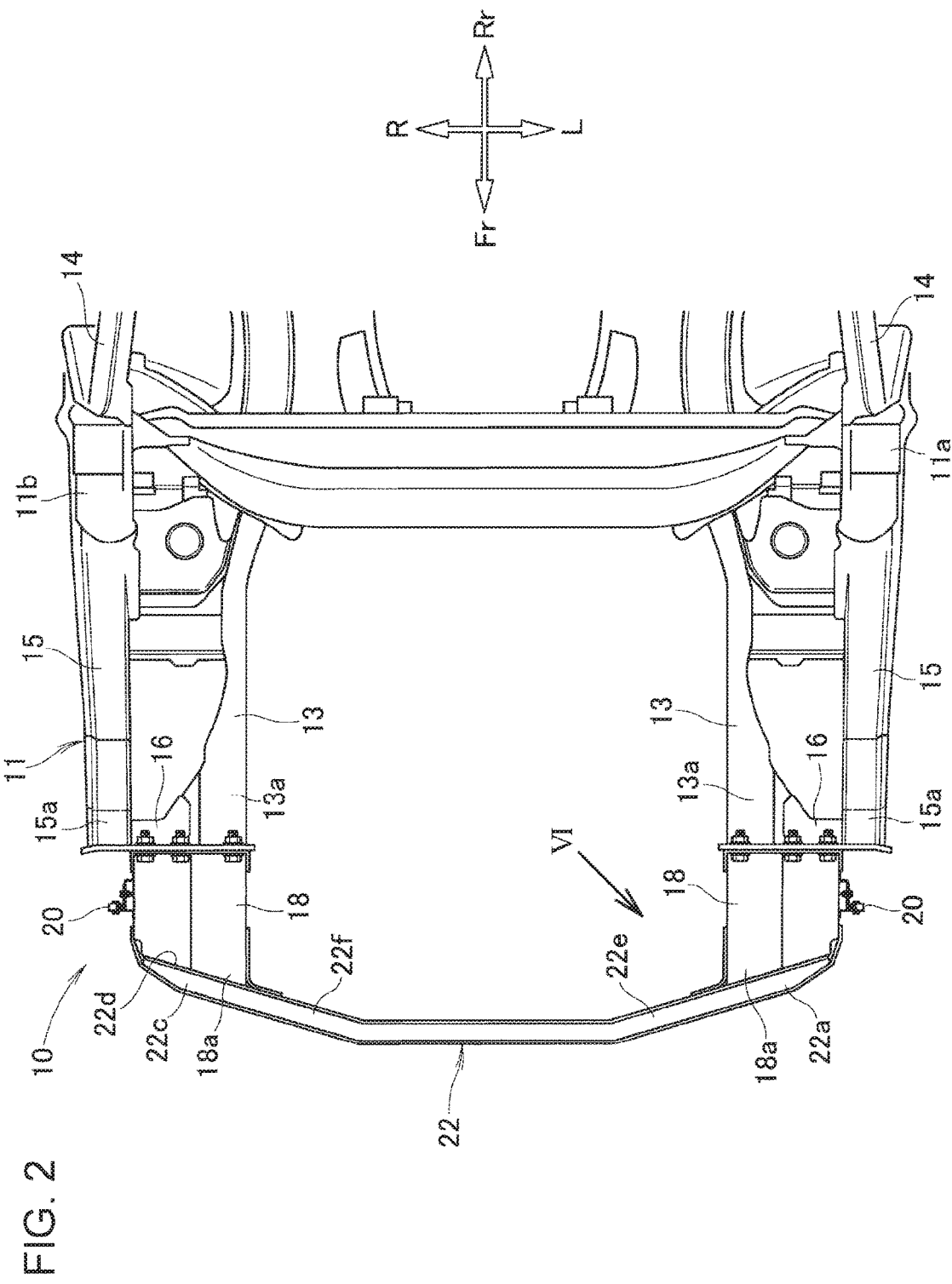
FIG. 2 is a plan view illustrating the vehicle body front section structure in FIG. 1.

As illustrated in FIG. 1 and FIG. 2, the vehicle body front section structure 10 includes a left front side frame (front side frame) 13 extending out along the vehicle body front-rear direction from a left front side portion 11a of a vehicle body 11, a left front pillar 14 provided at a vehicle width direction outside of the left front side frame 13, a left upper member (upper member) 15 extending out from the left front pillar 14 at a downward incline toward the vehicle body front, and a left coupling section (coupling section) 16 that couples the left upper member 15 and the left front side frame 13 together.

The vehicle body front section structure 10 further includes a left bumper beam extension (bumper beam extension) 18 provided to the left coupling section 16 and the left front side frame 13, the sensor attachment structure 20 provided to the left bumper beam extension 18, and a bumper beam 22 spanning between respective front ends 18a of the left bumper beam extension 18 and a right bumper beam extension (bumper beam extension) 18.

The left front side frame 13 extends out from beneath the left side of a lower dash panel 24 toward the vehicle body front, and is a framework-foaming member of the vehicle body 11. The left front pillar 14 is provided on the vehicle width direction outside of the left front side frame 13. The left upper member 15 extends out from the left front pillar 14 with a downward incline toward the vehicle body front, so as to approach the left coupling section 16. In this state, the left upper member 15 is provided on the vehicle width direction outside of the left front side frame 13.

Figure 3:
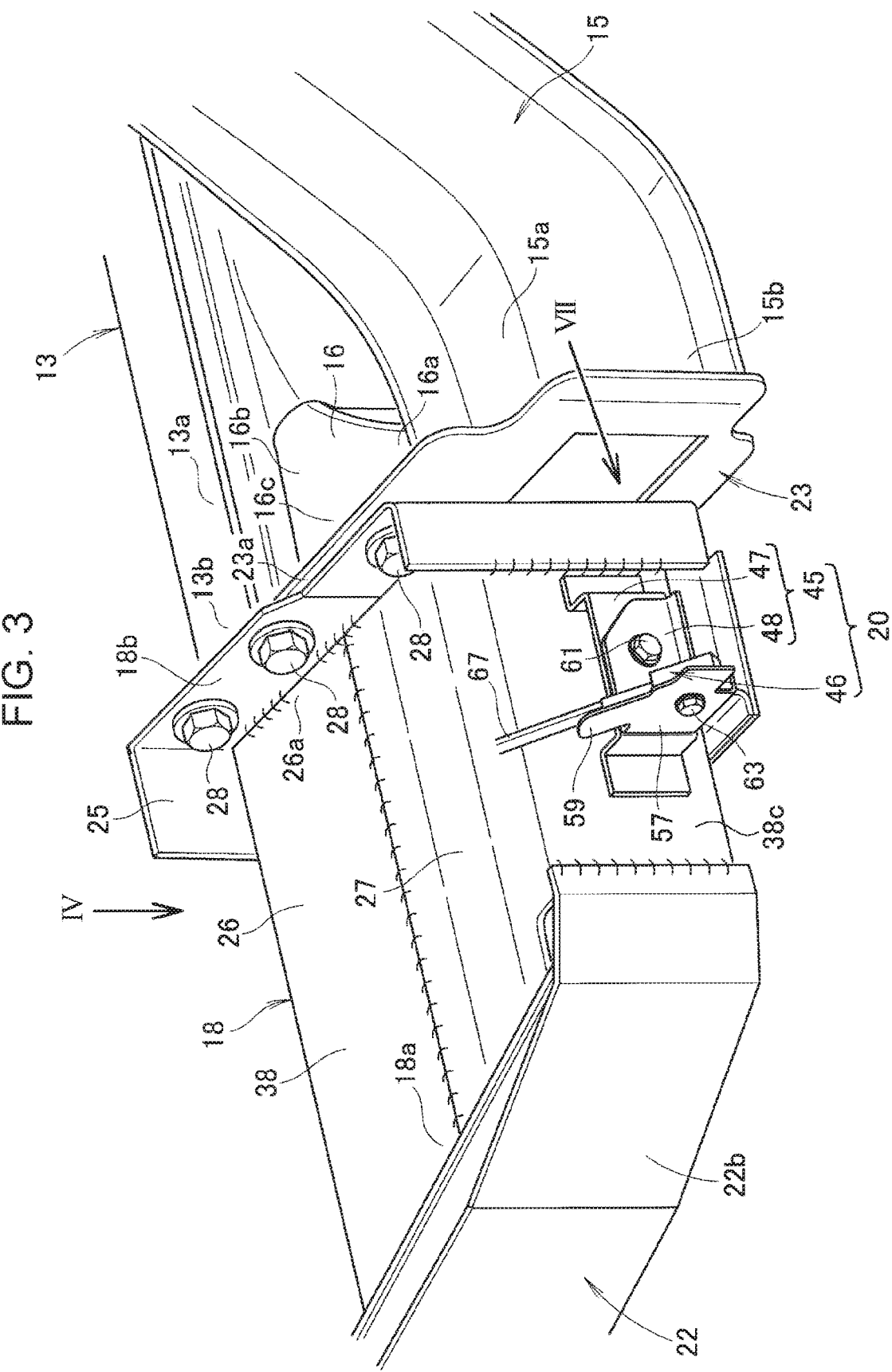
FIG. 3 is an enlarged view of region III in FIG. 1.
Figure 4:
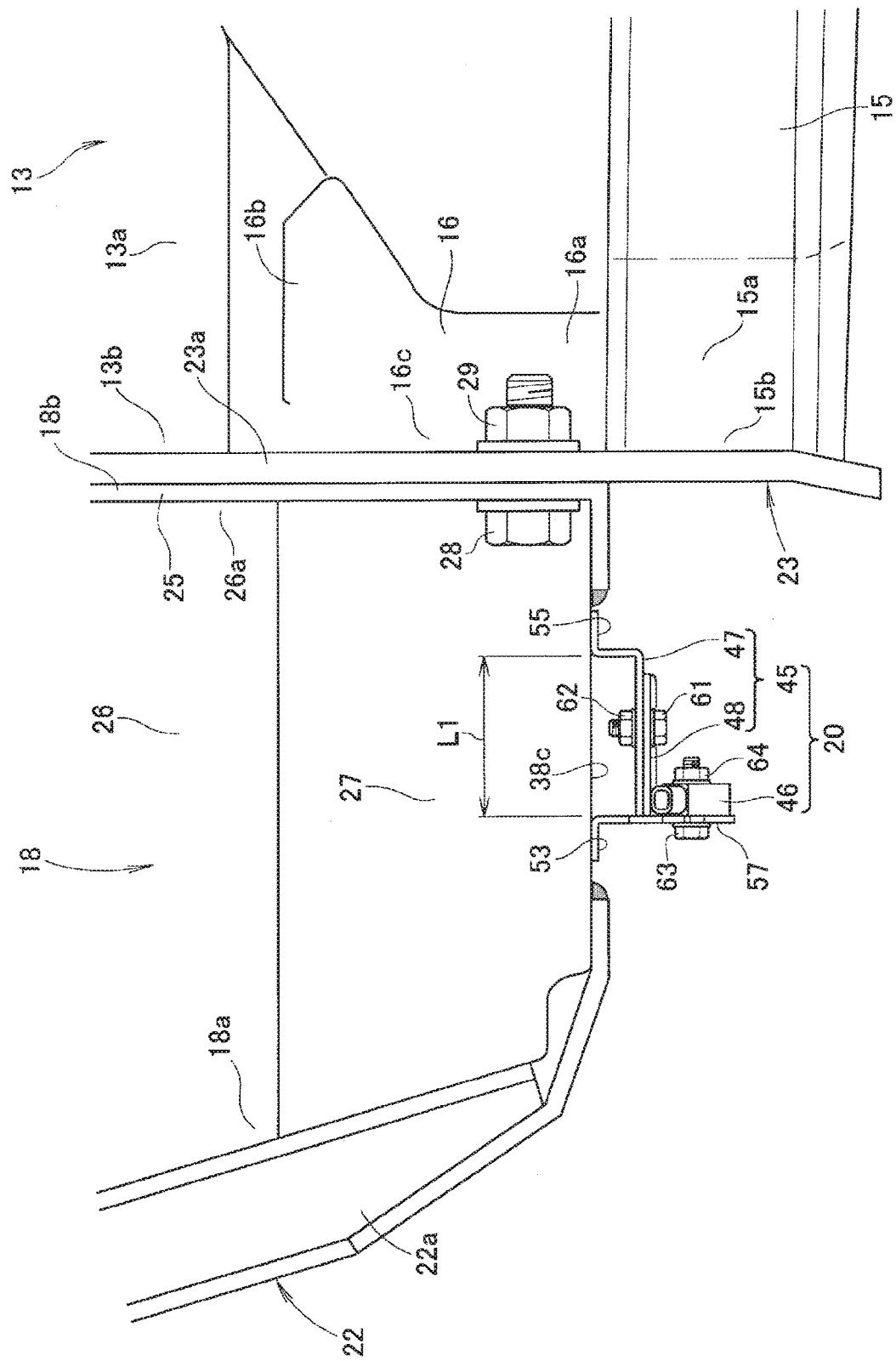
FIG. 4 is a view along arrow IV in FIG. 3.

As illustrated in FIG. 3 and FIG. 4, a front portion 15a of the left upper member 15 is coupled to an outer end portion 16a of the left coupling section 16. Moreover, an inner end portion 16b of the left coupling section 16 is coupled to a front portion 13a of the left front side frame 13. Namely, the front portion 13a of the left front side frame 13 is coupled to the front portion 15a of the left upper member 15 through the left coupling section 16.

An attachment bracket 23 is provided at a front end 13b of the left front side frame 13, a front end 16c of the left coupling section 16, and a front end 15b of the left upper member 15. A rear end 18b of the left bumper beam extension 18 is attached to a location 23a on the vehicle width direction inside of the attachment bracket 23.

Namely, the rear end 18b of the left bumper beam extension 18 is provided at the front end 13b of the left front side frame 13 and the front end 16c of the left coupling section 16, such that the attachment bracket 23 is interposed between the rear end 18b of the left bumper beam extension 18 and the front end 13b of the left front side frame 13 and the front end 16c of the left coupling section 16. In this state, the left bumper beam extension 18 extends out from the front end 13b of the left front side frame 13 and the front end 16c of the left coupling section 16 toward the vehicle body front.

Figure 5:
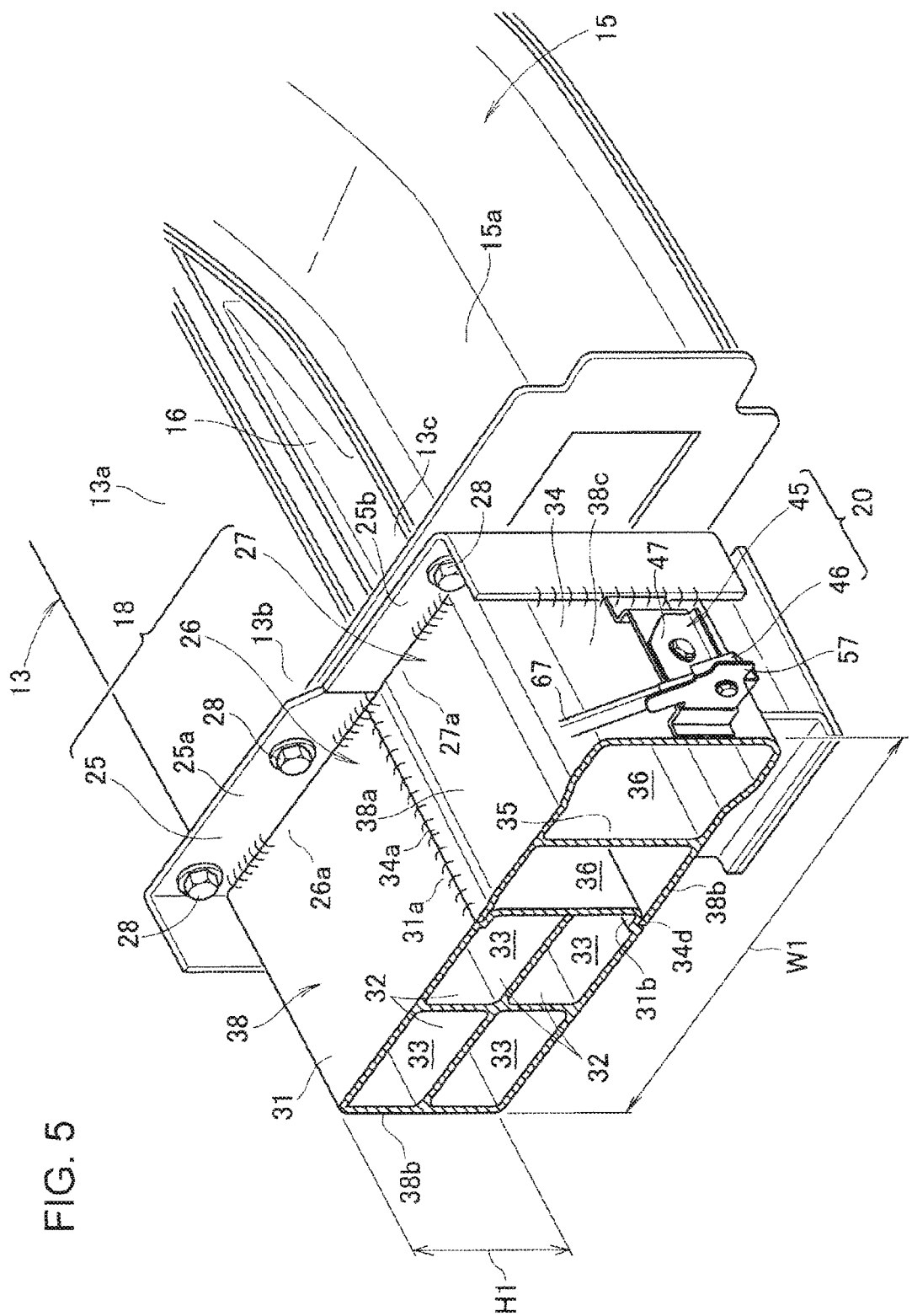
FIG. 5 is a perspective view illustrating a state in which the left bumper beam extension in FIG. 3 has been cut away along a vehicle width direction.

As illustrated in FIG. 5, the left bumper beam extension 18 is famed from a lightweight metal member such as an aluminum alloy. Specifically, the left bumper beam extension 18 includes a coupling plate 25 attached to a left attachment member 19, a first shock absorbing member 26 attached to the vehicle width direction inside of the coupling plate 25, and a second shock absorbing member 27 attached to the vehicle width direction outside of the coupling plate 25.

Namely, the second shock absorbing member 27 is provided at the vehicle width direction outside of the first shock absorbing member 26.

The coupling plate 25 is, for example, a member famed by extruding a lightweight metal such as an aluminum alloy so as to extend with a uniform cross-section profile. The coupling plate 25 can accordingly be famed (namely, manufactured) easily.

The coupling plate 25 is attached to the left attachment member 19 from the vehicle body front side using bolts 28 and nuts 29 (see FIG. 4 for the nuts 29).

The first shock absorbing member 26 is, for example, a member formed by extruding a lightweight metal such as an aluminum alloy so as to extend with a uniform cross-section profile along the vehicle body front-rear direction. The first shock absorbing member 26 can accordingly be formed (namely, manufactured) easily. A base portion 26a of the first shock absorbing member 26 is joined to a vehicle width direction inside half 25a of the coupling plate 25 by MIG welding.

Specifically, the first shock absorbing member 26 includes a first external peripheral wall 31 famed with a substantially rectangular shaped closed cross-section profile, and first partitioning walls 32 that internally partition the first external peripheral wall 31. The first partitioning walls 32 are, for example, formed so as to give a substantially cross shaped (lattice shaped) cross-section.

Namely, the first shock absorbing member 26 is famed with a closed cross-section by the first external peripheral wall 31, and the closed cross-section is partitioned into plural small compartments (closed cross-sections) 33 in a lattice shape by the first partitioning walls 32. The first shock absorbing member 26 is thus formed with a closed cross-section substantially in the shape of a rectangle divided into four smaller rectangles.

The second shock absorbing member 27 is joined to the vehicle width direction outside of the first external peripheral wall 31 by welding.

Similarly to the first shock absorbing member 26, the second shock absorbing member 27 is, for example, a member formed by extruding a lightweight metal such as an aluminum alloy so as to extend with a uniform cross-section profile along the vehicle body front-rear direction. The second shock absorbing member 27 can accordingly be formed (namely, manufactured) easily.

The coupling plate 25, the first shock absorbing member 26, and the second shock absorbing member 27 (namely, the left bumper beam extension 18) can accordingly be easily manufactured.

A base portion 27a of the second shock absorbing member 27 is joined to a vehicle width direction outside half 25b of the coupling plate 25 by MIG welding. Specifically, the second shock absorbing member 27 includes a second external peripheral wall 34 famed with a substantially U-shaped cross-section (a shape corresponding to three sides of a rectangle), and a second partitioning wall 35 that internally partitions the second external peripheral wall 34.

The second external peripheral wall 34 is formed with a substantially U-shaped cross-section opening toward the vehicle width direction inside. An upper inside end portion 34a of the second external peripheral wall 34 is joined to an upper outside end portion 31a of the first external peripheral wall 31 by welding. Moreover, a lower inside end portion 34b of the second external peripheral wall 34 is joined to a lower outside end portion 31b of the first external peripheral wall 31 by welding. In this joined state, the inside of the second external peripheral wall 34 is divided into small compartments (closed cross-sections) 36 on the inside and the outside of the second partitioning wall 35. The second partitioning wall 35 is famed with a substantially I-shaped cross-section.

A closed cross-section in the shape of a rectangle divided into two smaller rectangles is formed by the second shock absorbing member 27 and the first external peripheral wall 31.

A large cross-section is secured for the left bumper beam extension 18 due to joining the second shock absorbing member 27 to the vehicle width direction outside of the first external peripheral wall 31 by welding. Specifically, an external face 38 of the left bumper beam extension 18 includes an upper face 38a, an inside face 38b, an outside face 38c, and a lower face 38d. The external face 38 of the left bumper beam extension 18 is formed with an external profile with a substantially rectangular shaped cross-section by the upper face 38a, the inside face 38b, the outside face 38c, and the lower face 38d.

A width dimension W1 of the upper face 38a and the lower face 38d (namely, of the left bumper beam extension 18) is formed larger than a height dimension H1 of the inside face 38b and the outside face 38c (namely, of the left bumper beam extension 18). Moreover, the inside of the left bumper beam extension 18 is partitioned into the plural small compartments 33, and the inner and outer small compartments 36.

Accordingly, the left bumper beam extension 18 is secured with appropriate strength and rigidity against light collisions (namely, light frontal collisions in a low speed range in which it is not necessary to deploy an airbag). This thereby enables compression (namely, axial crushing) of the left bumper beam extension 18 to be suppressed in a light collision.

However, for example, in a high speed frontal collision or a small overlap collision sufficient to fully crush the bumper beam extension over its entire range, the left bumper beam extension 18 can be adequately compressed by the impact load.

Moreover, the front portion 15a of the left upper member 15 is coupled to the front portion 13a of the left front side frame 13 by the left coupling section 16. The left bumper beam extension 18 is provided at the front end 13b of the left front side frame 13 and the front end 16c of the left coupling section 16.

Accordingly, in a high speed frontal collision or a small overlap collision, for example, impact load can be supported by both the left front side frame 13 and the left upper member 15.

The left bumper beam extension 18 can thus undergo adequate compression (axial crushing) due to the impact load.

In this manner, in a high speed frontal collision or a small overlap collision, for example, the left bumper beam extension 18 is adequately compressed by the input impact load, thereby enabling an energy absorption amount to be increased.

Note that a small overlap collision is a collision in which a front section of the vehicle collides with an obstacle such as a vehicle, tree, or electricity pole at a front side portion at the outside of the left front side frame 13 at ¼ in the vehicle width direction. Note that small overlap collisions are also referred to as narrow offset collisions.

Figure 6:
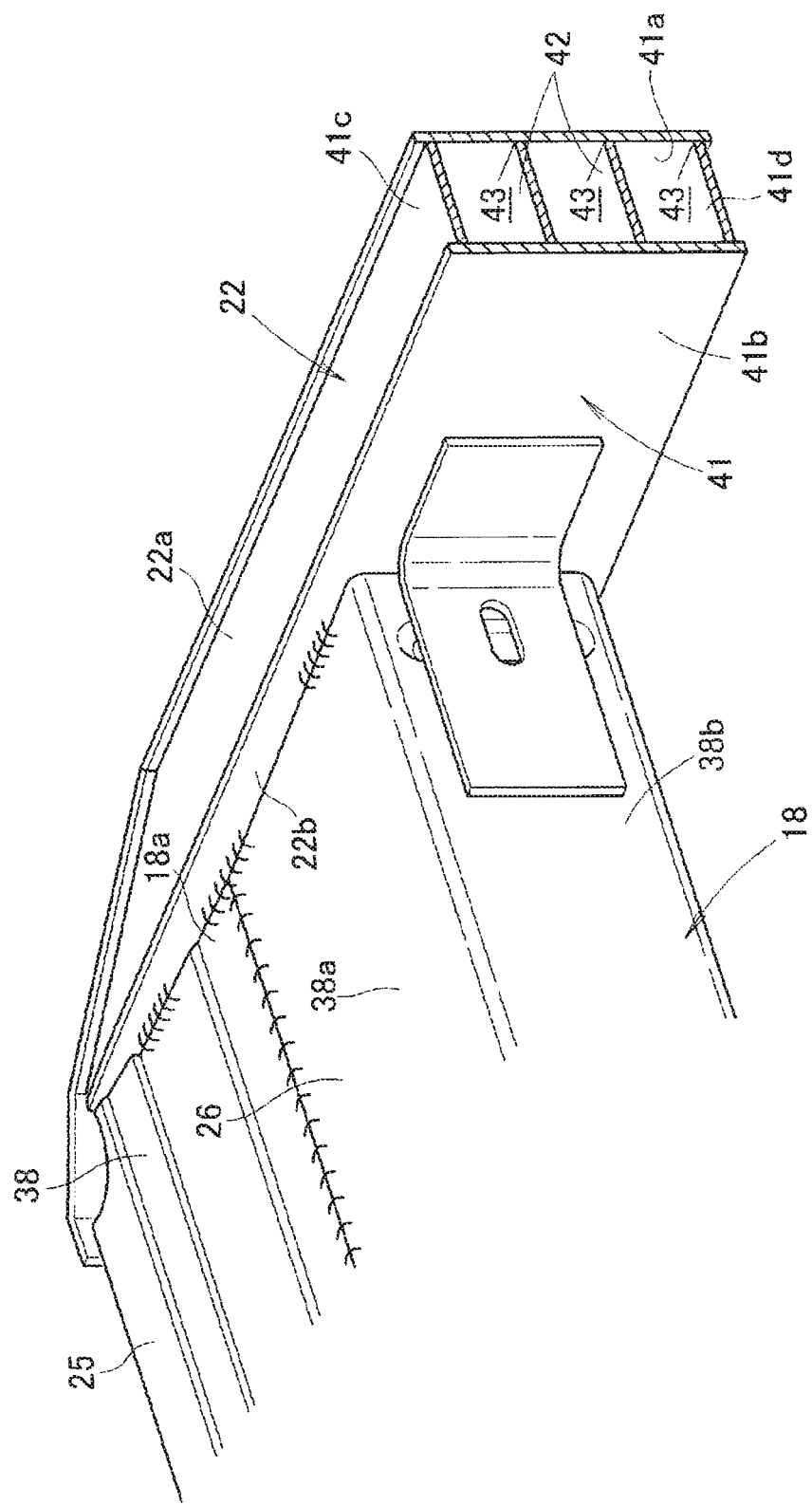
FIG. 6 is a view along arrow VI in FIG. 2.

As illustrated in FIG. 6, a left end portion 22a of the bumper beam 22 is joined to the front end 18a of the left bumper beam extension 18. The bumper beam 22 is, for example, a member formed from a lightweight metal member such as an aluminum alloy. A beam rear wall (rear portion) 22b of the left end portion 22a of the bumper beam 22 is joined (fixed) to the front end 18a of the left bumper beam extension 18 by MIG welding.

As illustrated in FIG. 2, a beam rear wall (rear portion) 22d of a right end portion 22c of the bumper beam 22 is joined (fixed) to the front end 18a of the right bumper beam extension 18 by MIG welding. The left bumper beam extension 18 accordingly extends out along the vehicle width direction.

In this state, a left section 22e of the bumper beam 22 extends out at an angle toward the vehicle width direction outside and the vehicle body rear. Similarly, a right section 22f of the bumper beam 22 extends out at an angle toward the vehicle width direction outside and the vehicle body rear.

Returning to FIG. 6, the bumper beam 22 includes a beam external peripheral wall 41 formed with a substantially rectangular shaped closed cross-section, and plural beam partitioning walls (for example, upper and lower beam partitioning walls) 42 that internally partition the beam external peripheral wall 41.

The beam external peripheral wall 41 includes a beam front wall 41a provided at a vehicle body front side, a beam rear wall 41b provided at the vehicle body rear of the beam front wall 41a, a beam top portion 41c coupling an upper end portion of the beam front wall 41a and an upper end portion of the beam rear wall 41b together, and a beam bottom portion 41*d* coupling a lower end portion of the beam front wall 41*a* and a lower end portion of the beam rear wall 41*b* together.

The beam front wall 41*a*, the beam rear wall 41*b*, the beam top portion 41*c*, and the beam bottom portion 41*d* form the beam external peripheral wall 41 with a substantially rectangular shaped hollow cross-section.

The upper and lower beam partitioning walls 42 inside the beam external peripheral wall 41 are provided substantially parallel to each other at a separation in the up-down direction. The beam external peripheral wall 41 is thereby internally partitioned into plural small compartments 43 in the up-down direction by the upper and lower beam partitioning walls 42.

Namely, the bumper beam 22 is formed with a closed cross-section including the plural small compartments 43. The bumper beam 22 is thereby famed with a closed cross-section resembling stacked rectangles.

In this manner, the beam external peripheral wall 41 of the bumper beam 22 is formed with a hollow closed cross-section partitioned into the plural small compartments 43 in the up-down direction by the upper and lower beam partitioning walls 42. The bumper beam 22 is formed so as to be capable of undergoing bending and crushing deformation in a light collision (namely, in a low speed range in which it is not necessary to deploy the airbag).

Moreover, the beam rear wall 41*b* at the left end portion 22*a* of the bumper beam 22 is joined to the front end 18*a* of the left bumper beam extension 18 by MIG welding. The left bumper beam extension 18 is secured with strength and rigidity against a light collision.

The bumper beam 22 is thereby capable of undergoing bending and crushing deformation to absorb impact load in a light collision.

Returning to FIG. 3, the sensor attachment structure 20 is provided to the outside face 38*c* of the external face 38 of the left bumper beam extension 18. The sensor attachment structure 20 includes a support section 45 provided to the outside face 38*c* of the left bumper beam extension 18, and an airbag sensor (Front Crash Sensor: FCS) 46 attached to the support section 45.

Figure 7:
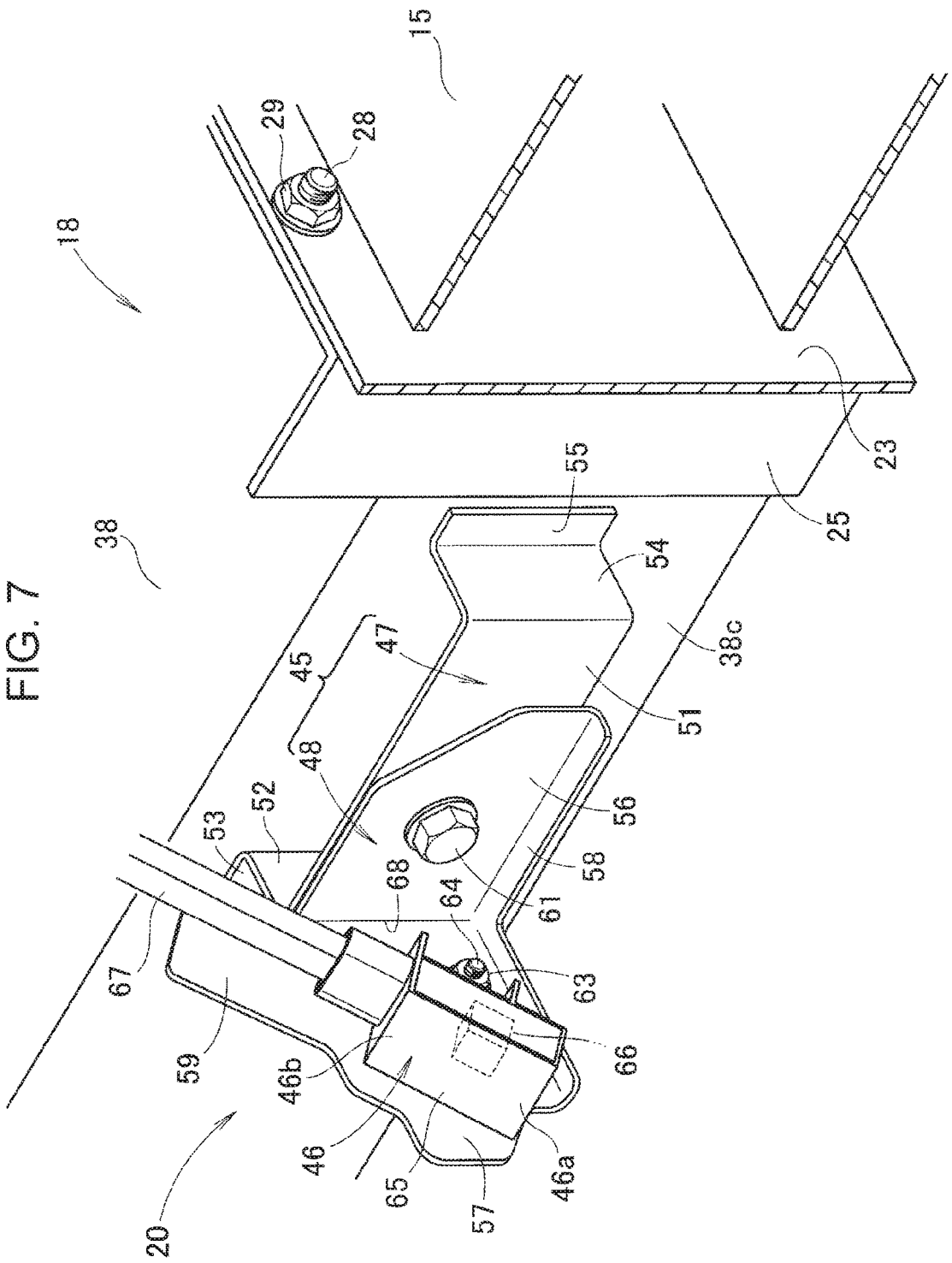
FIG. 7 is a view along arrow VII in FIG. 3.
Figure 8:
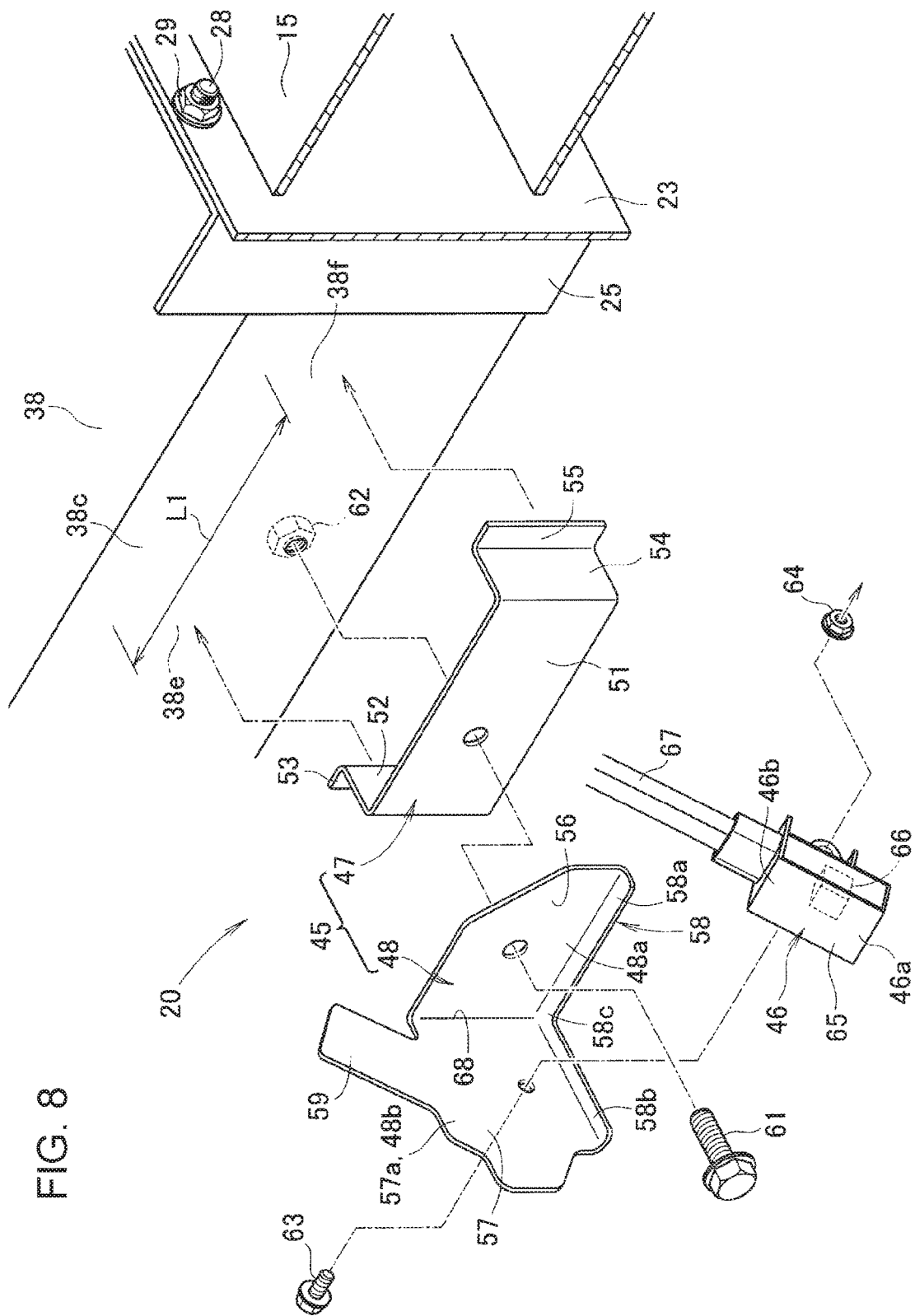
FIG. 8 is an exploded perspective view illustrating the airbag sensor attachment structure in FIG. 7.

As illustrated in FIG. 7 and FIG. 8, the support section 45 includes a stay 47 provided to the outside face 38*c* of the left bumper beam extension 18, and a bracket 48 provided to the stay 47.

The stay 47 includes an apex portion (top portion) 51 famed in a substantially rectangular shape in side view, a front leg portion 52 formed at a front end of the apex portion 51, a front joining portion 53 formed at a vehicle width direction inside end of the front leg portion 52, a rear leg portion 54 formed at a rear end of the apex portion 51, and a rear joining portion 55 formed at a vehicle width direction inside end of the rear leg portion 54.

The front leg portion 52 is bent from the front end of the apex portion 51 toward the outside face 38*c* of the left bumper beam extension 18. The front joining portion 53 is bent from the vehicle width direction inside end of the front leg portion 52 toward the vehicle body front so as to follow the outside face 38*c* of the left bumper beam extension 18.

Moreover, the rear leg portion 54 is bent from the rear end of the apex portion 51 toward the outside face 38*c* of the left bumper beam extension 18. The rear joining portion 55 is bent from the vehicle width direction inside end of the rear leg portion 54 toward the vehicle body rear so as to follow the outside face 38*c* of the left bumper beam extension 18.

The apex portion 51, the front leg portion 52, the front joining portion 53, the rear leg portion 54, and the rear joining portion 55 form the stay 47 with a substantially hat-shape in plan view. The stay 47 is formed from an aluminum alloy, similarly to the left bumper beam extension 18.

The front joining portion 53 is joined to a frontal location 38*e* of the outside face 38*c* of the left bumper beam extension 18. The rear joining portion 55 is joined to the outside face 38*c* of the left bumper beam extension 18 at a location 38*f* that is at a spacing L1 toward the vehicle body rear of the front joining portion 53 by. Namely, the front joining portion 53 and the rear joining portion 55 are provided to the outside face 38*c* of the left bumper beam extension 18 with the spacing L1 in the vehicle body front-rear direction.

In this state, the apex portion 51 is disposed at a position separated toward the vehicle width direction outside from the outside face 38*c* of the left bumper beam extension 18.

The bracket 48 is provided to the apex portion 51 of the stay 47. The bracket 48 is formed from sheet steel. Specifically, the bracket 48 includes an attachment base portion 56 attached to the apex portion 51, a projecting portion 57 projecting out from the attachment base portion 56, a flange 58 formed to the attachment base portion 56 and the projecting portion 57, and a connector protector 59 formed to the projecting portion 57.

The attachment base portion 56 is fastened to the apex portion 51 by a bolt 61 and a nut 62 (namely, a fastening member) in an abutted state of the attachment base portion 56 along the apex portion 51 of the stay 47. The projecting portion 57 is bent from a front end of the attachment base portion 56 toward the vehicle width direction outside. The attachment base portion 56 and the projecting portion 57 form the bracket 48 with a substantially L-shape in plan view.

Note that the stay 47 is famed from an aluminum alloy, and the bracket 48 is formed from sheet steel. The attachment base portion 56 made from steel is thus attached to the apex portion 51 made from an aluminum alloy by the bolt 61 and the nut 62. The bolt 61 and the nut 62 are coated against galvanic corrosion.

Galvanic corrosion between the stay 47, the bolt 61, and the nut 62 can accordingly be suppressed, enabling the durability of the stay 47, the bolt 61, and the nut 62 to be raised.

Note that an anti-rust coating that decreases the potential difference between different materials is employed for the coating against galvanic corrosion. An example of this is GEOMET720 (brand name and "GEOMET" is a registered trademark).

The airbag sensor 46 is attached to the projecting portion 57 by a bolt 63 and a nut 64. In this state, an upper end 46*b* of the airbag sensor 46 is disposed at the vehicle width direction inside and upper side of a lower end 46*a* of the airbag sensor 46.

Namely, the airbag sensor 46 is disposed in an inclined state upward and toward the vehicle width direction inside.

The airbag sensor 46 is installed with a detector (namely a G-chip) 66 inside a sensor case 65.

A wire harness 67 is connected to the upper end 46*b* of the airbag sensor 46. The wire harness 67 extends from the upper end 46*b* of the airbag sensor 46 in an inclined state upward and toward the vehicle width direction inside.

The attachment base portion 56 and the projecting portion 57 are formed in a substantially L-shape in plan view, thus foaming a bend portion 68 at a location where the attachment base portion 56 and the projecting portion 57 intersect each other. The flange 58 is formed so as to be continuous to respective lower ends (namely, lower ends of the bracket 48) 48a of the attachment base portion 56, the projecting portion 57, and the bend portion.

Specifically, the flange 58 includes a first flange location 58a bent from the lower end of the attachment base portion 56 toward the vehicle width direction outside, a second flange location 58b bent from the lower end of the projecting portion 57 toward the vehicle body rear, and a third flange location 58c bent from the lower end of the bend portion so as to couple the first flange location 58a and the second flange location 58b together.

The flange 58 is famed at the lower ends 48a of the bracket 48 in this manner. The strength and rigidity of the bracket 48 can accordingly be raised by the flange 58. This thereby enables the characteristic resonance value of the bracket 48 to be raised, and enables the anti-noise performance (anti-vibration performance) of the airbag sensor 46 to be improved.

The connector protector 59 protrudes out from an upper end 48b (specifically, an upper end 57a of the projecting portion 57) of the bracket 48. The connector protector 59 is disposed at the vehicle body front side of the wire harness 67, and protrudes out in an inclined state upward and toward the vehicle width direction inside, following the wire harness 67.

This thereby enables the wire harness 67 of the airbag sensor 46 to be protected by the connector protector 59, even when the airbag sensor 46 is provided in a range intruded into by a colliding object. This thereby enables cutting of the connection of the wire harness 67 to the airbag sensor 46 to be prevented, even in, for example, a high speed frontal collision, a small overlap collision, or an offset collision.

As described above, the stay 47 of the support section 45 is famed in a substantially hat-shape in plan view, and the front joining portion 53 and the rear joining portion 55 of the stay 47 are provided to the outside face 38c of the left bumper beam extension 18. This thereby enables the strength and rigidity of the stay 47 to be raised.

Moreover, since the stay 47 is formed in a substantially hat-shape in plan view, the apex portion 51 of the stay 47 can be separated from the outside face 38c of the left bumper beam extension 18.

The attachment base portion 56 of the bracket 48 is provided at the apex portion 51 of the stay 47, and the projecting portion 57 projects out from the attachment base portion 56. The projection amount (extension amount) of the projecting portion 57 can thereby kept small. The airbag sensor 46 is attached to the projecting portion 57.

The characteristic vibration value of the support section 45 is thereby raised in a state in which the airbag sensor 46 is supported by the support section 45, enabling the anti-noise performance (anti-vibration performance) of the airbag sensor 46 to be improved. This thereby enables collision information required for airbag deployment to be detected precisely and at an early stage by the airbag sensor 46.

Note that it is conceivable that, for example, the bracket 48 (namely, the projecting portion 57) could hit a counterpart vehicle in an offset collision at a lower limit of a speed for actuating the airbag (specifically, in an intermediate speed range).

The bracket 48 is therefore formed from sheet steel. This thereby enables a bending state of the projecting portion 57 with respect to impact load input to the projecting portion 57 to be regulated (controlled) easily when the projecting portion 57 of the bracket 48 hits the counterpart vehicle.

Returning to FIG. 4, the support section 45 is provided to the outside face 38c of the left bumper beam extension 18, and the airbag sensor 46 is attached to the support section 45.

Note that, for example in a light collision in a low speed range in which it is not necessary to deploy the airbag, the bumper beam 22 undergoes bending and crushing deformation to absorb the impact load. On the other hand, the left bumper beam extension 18 has sufficient strength and rigidity against light collisions. There is accordingly little compression (namely, axial compression) of the left bumper beam extension 18 in a light collision.

Movement of the airbag sensor 46 toward the vehicle body rear in a light collision is thereby suppressed, enabling the airbag sensor 46 to be prevented from making unnecessary detection of a light collision and deploying the airbag.

Note that in an offset collision at the lower limit of the speed for actuating the airbag, the front end 18a of the left bumper beam extension 18 intrudes into a comparatively soft location of a frontmost section of the counterpart vehicle in an initial stage of the offset collision. Accordingly, the comparatively soft location of the counterpart vehicle impinges on the support section 45 (in particular, the projecting portion 57), such that the projecting portion 57 is bent toward the vehicle body rear, and the support section 45 retreats toward the vehicle body rear.

The airbag sensor 46 accordingly retreats toward the vehicle body rear together with the support section 45, enabling collision information required for airbag deployment to be detected precisely and at an early stage by the airbag sensor 46. This thereby enables the airbag to be deployed in an initial stage of the offset collision.

Note that an offset collision is a collision in which part of the front section of the vehicle (approximately half of the width of the front of the vehicle body) collides with an obstacle such as another vehicle.

Moreover, the front joining portion 53 and the rear joining portion 55 of the stay 47 are provided to the outside face 38c of the left bumper beam extension 18 at the spacing L1 in the vehicle body front-rear direction. Namely, the strength and rigidity of the stay 47 in the direction in which the left bumper beam extension 18 is compressed are kept appropriately low.

Accordingly, in a high speed frontal collision or a small overlap collision sufficient to fully crush the left bumper beam extension 18 over its entire range, the front joining portion 53 of the stay 47 can be moved appropriately toward the vehicle body rear during compression of the left bumper beam extension 18 toward the vehicle body rear due to the input impact load.

Since the front joining portion 53 of the stay 47 is moved appropriately toward the vehicle body rear, there is no concern of compression (crushing defamation) of the left bumper beam extension 18 being obstructed by the stay 47. This thereby enables stable compression of the left bumper beam extension 18 toward the vehicle body rear, and enables stable defamation of the left front side frame 13.

Accordingly, the airbag sensor 46 can be made to retreat appropriately toward the vehicle body rear due to compression of the left bumper beam extension 18. This thereby enables collision information for a high speed frontal collision or small overlap collision to be detected precisely and at an early stage by the airbag sensor 46.

Figure 9:
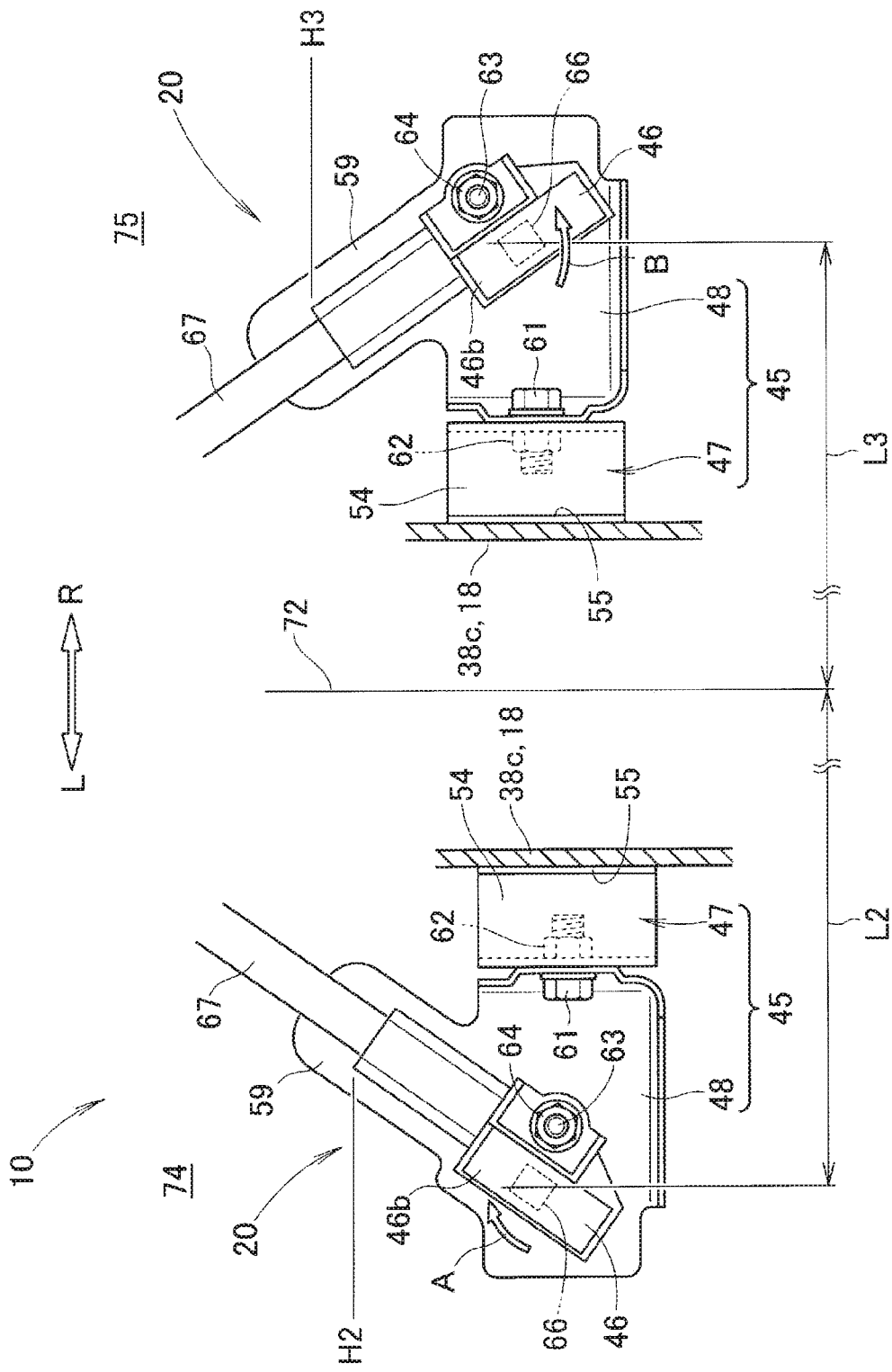
FIG. 9 is a cross-section taken along line IX-IX in FIG. 1.

As illustrated in FIG. 9, the airbag sensor 46 on the left side is attached to the left bumper beam extension 18 through the support section 45 on the left side. The airbag sensor 46 on the right side is attached to the right bumper beam extension 18 through the support section 45 on the right side. The left side airbag sensor 46 and the right side airbag sensor 46 are similar members.

Note that, for example, if the left side airbag sensor 46 and the right side airbag sensor 46 were disposed vertically, the detector 66 of the left side airbag sensor 46 would be disposed on the vehicle width direction outside of the bolt 63. On the other hand, the detector 66 of the right side airbag sensor 46 would be disposed on the vehicle width direction inside of the bolt 63.

Accordingly, the detector 66 on the left side would be a greater distance from a vehicle body center 72 than the detector 66 on the right side. Accordingly, for example, were the vehicle body front section structure 10 to be involved in a high speed frontal collision, a left/right discrepancy would arise between the left side detector 66 and the right side detector 66, making accurate collision mode determination difficult.

The left side airbag sensor 46 is therefore attached in a state inclined upward toward the vehicle width direction inside. The left side detector 66 of the left side airbag sensor 46 is thereby disposed further to the vehicle width direction inside than it would be if installed vertically, as shown by arrow A.

However, the right side airbag sensor 46 is attached in a state inclined upward toward the vehicle width direction inside. The right side detector 66 of the right side airbag sensor 46 is thereby disposed further to the vehicle width direction outside than it would be if installed vertically, as shown by arrow B.

Namely, a distance L2 from the left side detector 66 to the vehicle body center 72 can be made the same as a distance L3 from the right side detector 66 to the vehicle body center 72. Accordingly, for example, a discrepancy in detection between the left side detector 66 and the right side detector 66 can be suppressed from arising when the vehicle body front section structure 10 is involved in a high speed frontal collision.

This thereby enables the left side airbag sensor 46 and the right side airbag sensor 46 to accurately determine the collision mode of a high speed frontal collision.

Moreover, the left side airbag sensor 46 attached to the left bumper beam extension 18 and the right side airbag sensor 46 attached to the right bumper beam extension 18 are configured by similar members.

In this manner, the left side airbag sensor 46 and the right side airbag sensor 46 can be configured using common components, thereby enabling the cost of the sensor attachment structure 20 to be suppressed.

Moreover, the left side airbag sensor 46 and the right side airbag sensor 46 are inclined, and the upper ends 46b of the respective airbag sensors 46 approach the sides of the respective stays 47, respectively. This thereby enables the wire harness 67 connected to the upper end 46b of the left side airbag sensor 46 to be brought closer to the side of the left side stay 47.

Similarly, the wire harness 67 connected to the upper end 46b of the right side airbag sensor 46 can be brought closer to the side of the right side stay 47.

This thereby enables the connector protector 59 that protects the left side wire harness 67 to be brought closer to the left side stay 47, enabling the characteristic vibration value of the left side support section 45 to be raised. Similarly, the connector protector 59 that protects the right side wire harness 67 can be brought closer to the right side stay 47, enabling the characteristic vibration value of the right side support section 45 to be raised.

Accordingly, resonance of the left and right side airbag sensors 46 is suppressed, thereby enabling erroneous detection by the left and right side airbag sensors 46 to be even better prevented.

Moreover, the left side airbag sensor 46 is inclined, thereby enabling a height H2 of the left side airbag sensor 46 to be kept low. Similarly, the right side airbag sensor 46 is inclined, thereby enabling a height H3 of the right side airbag sensor 46 to be kept low. This thereby enables a space 74 to be secured above the left side airbag sensor 46, and enables a space 75 to be secured above the right side airbag sensor 46.

This enables an increase in the degree of freedom in the layout of surrounding components when placing surrounding components (headlights, cooling pipes, and small lights such as fog lamps) in the space 74 and the space 75. This moreover enables any effect on the performance of the surrounding components to be kept small.

Figure 10A:
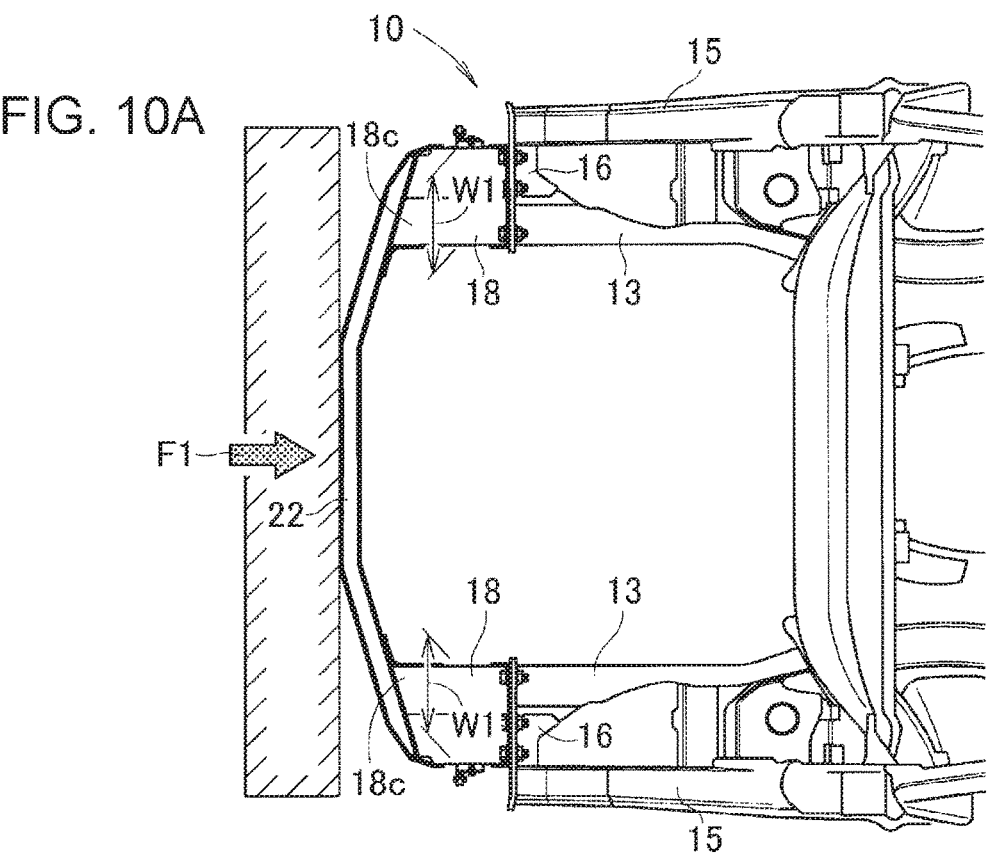
FIG. 10A and FIG. 10B are explanatory diagrams to explain an example of impact load absorption by a vehicle body front section structure according to the embodiment of the present disclosure in a light collision.
Figure 10B:
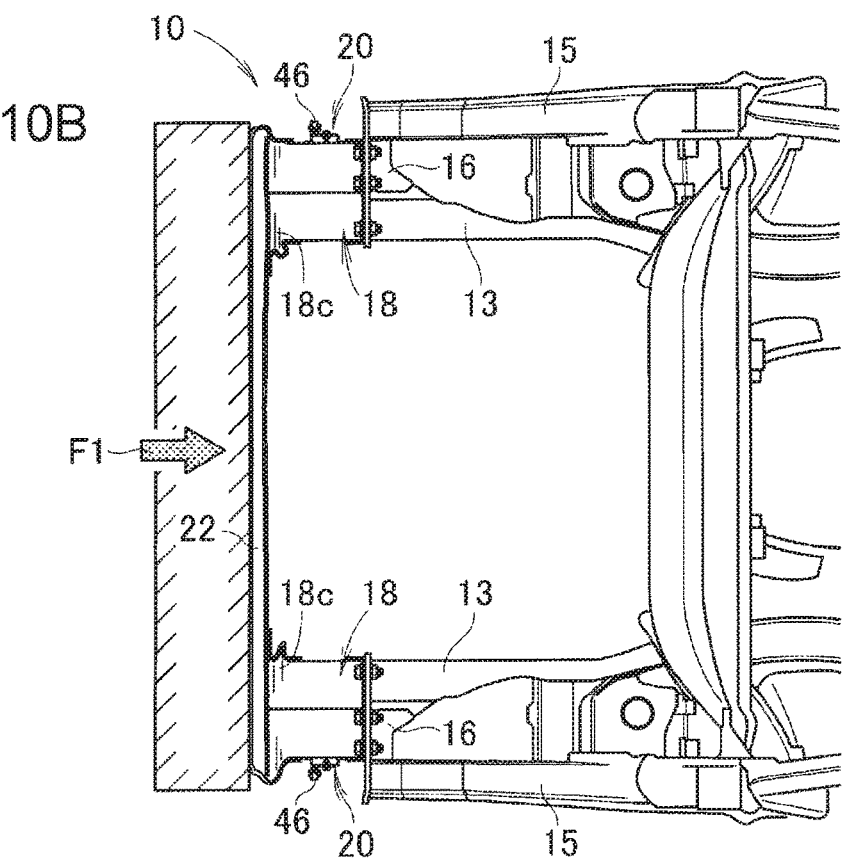

Next, with reference to FIG. 10A and FIG. 10B, explanation follows regarding an example of absorption of an input impact load F1 by the vehicle body front section structure 10 when the impact load F1 is input to the vehicle body front section structure 10 in a light collision (namely, in a low speed range in which it is not necessary to deploy the airbag).

As illustrated in FIG. 10A, in a light collision, the impact load F1 is input into the bumper beam 22 of the vehicle body front section structure 10.

Note that the width dimension W1 of the left bumper beam extension 18 is formed large, and the inside of the left bumper beam extension 18 is partitioned into the plural small compartments 33 and the inner and outer small compartments 36 (see FIG. 5). Similarly, the width dimension W1 of the right bumper beam extension 18 is formed large, and the inside of the right bumper beam extension 18 is partitioned into plural small compartments and inner and outer small compartments.

Accordingly, the left bumper beam extension 18 and the right bumper beam extension 18 are secured with appropriate strength and rigidity against the impact load F1 input to the bumper beam 22.

As illustrated in FIG. 10B, the bumper beam 22 undergoes bending and crushing defamation due to the impact load F1 input to the bumper beam 22. Moreover, a leading end portion 18c of the left bumper beam extension 18 and a leading end portion 18c of the right bumper beam extension 18 also deform.

The impact load F1 input in a light collision can be absorbed by the deformation of the bumper beam 22 and of the respective leading end portions 18c of the left bumper beam extension 18 and the right bumper beam extension 18.

Accordingly, the left bumper beam extension 18 and the right bumper beam extension 18 can be suppressed from undergoing compression (namely, axial crushing) toward the vehicle body rear. This thereby enables the left side airbag sensor 46 and the right side airbag sensor 46 to be maintained in a static state, thereby enabling the left and right airbag sensors 46 to be prevented from unnecessarily detecting a light collision and deploying the airbag.

Figure 11A:
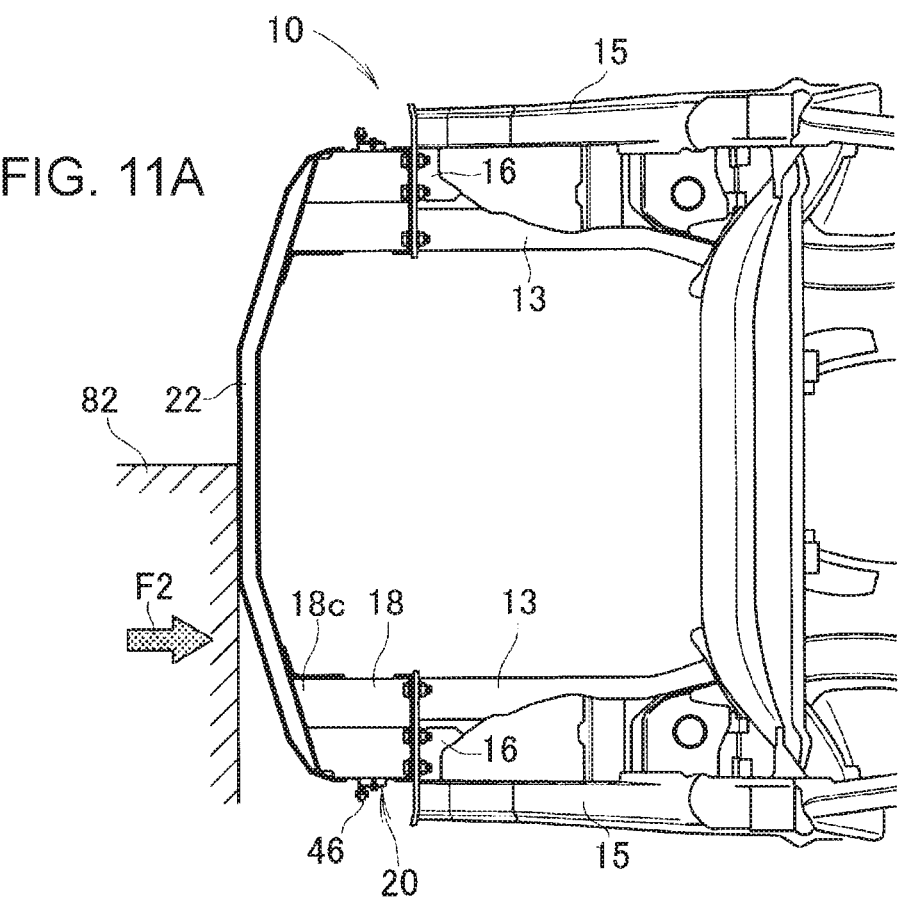
FIG. 11A and FIG. 11B are explanatory diagrams to explain an example of early detection of collision information by an airbag sensor attachment structure according to the embodiment of the present disclosure in an offset collision.
Figure 11B:
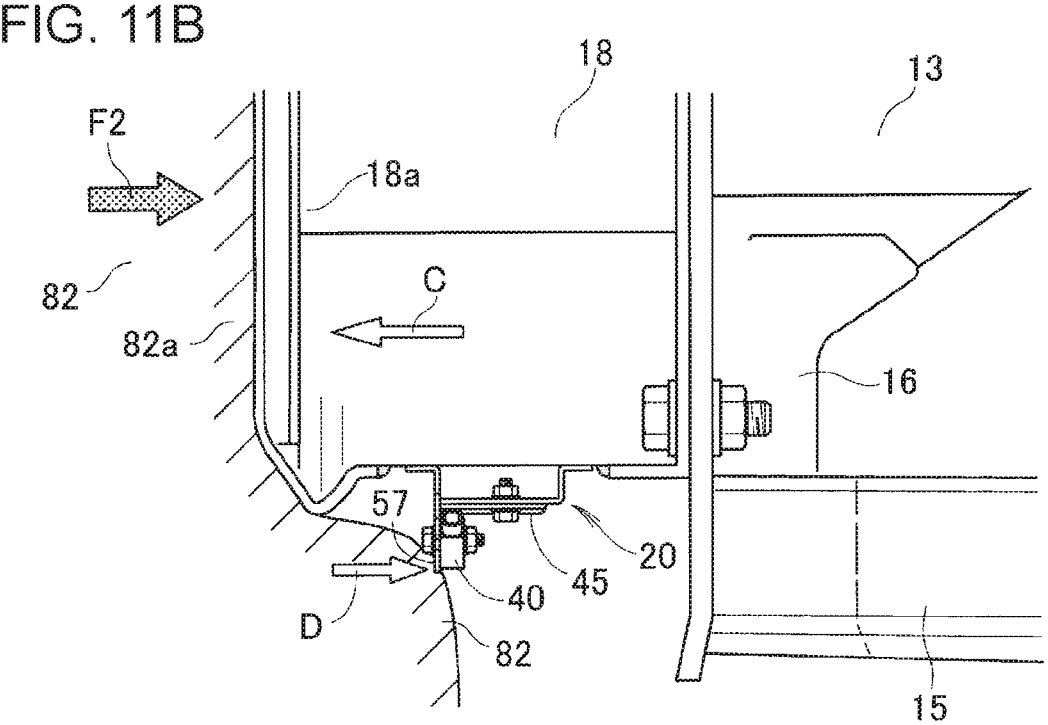

Next, with reference to FIG. 11A and FIG. 11B, explanation follows regarding an example in which the airbag is deployed due to an input impact load F2 when the impact load F2 is input to the vehicle body front section structure 10 in an offset collision at the lower limit of the speed for actuating the airbag (specifically, in the intermediate speed range).

Note that FIG. 11B illustrates the left side members and omits the right side members in order to facilitate understanding of the operation.

As illustrated in FIG. 11A, in an offset collision the impact load F2 is input to the bumper beam 22 of the vehicle body front section structure 10. The bumper beam 22 undergoes bending and crushing defamation due to the impact load F2 input to the bumper beam 22. Moreover, the leading end portion 18c of the left bumper beam extension 18 and the leading end portion 18c of the right bumper beam extension 18 also deform.

As illustrated in FIG. 11B, in an initial stage of the offset collision, the front end 18a of the left bumper beam extension 18 intrudes into a comparatively soft location 82a of a frontmost section of a counterpart vehicle 82, as illustrated by arrow C.

Accordingly, the comparatively soft location 82a of the counterpart vehicle impinges on the support section 45 (in particular, the projecting portion 57). The projecting portion 57 bends toward the vehicle body rear, and the airbag sensor 46 retreats toward the vehicle body rear together with the support section 45, as illustrated by arrow D.

The airbag sensor 46 accordingly retreats toward the vehicle body rear together with the support section 45, as illustrated by arrow D. The collision information required for airbag deployment can accordingly be detected precisely and at an early stage by the airbag sensor 46 due to the airbag sensor 46 retreating.

This thereby enables the airbag to be deployed in an initial stage of the offset collision.

Figure 12A:
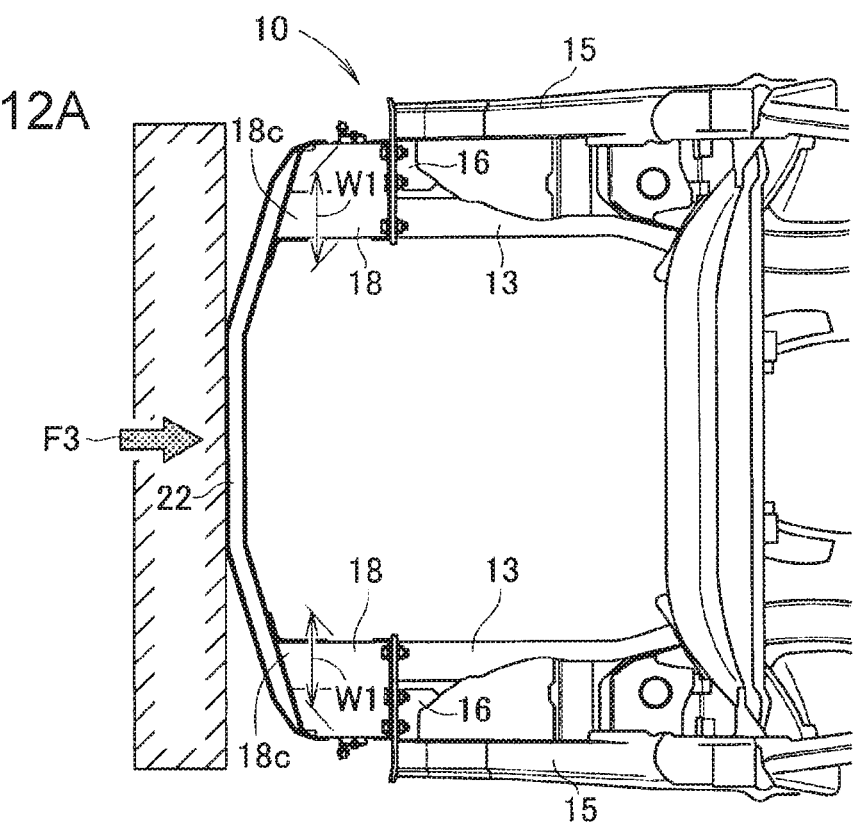
FIG. 12A and FIG. 12B are explanatory diagrams to explain an example of compression of a left bumper beam extension according to the embodiment of the present disclosure due to impact load in a high speed frontal collision.
Figure 12B:
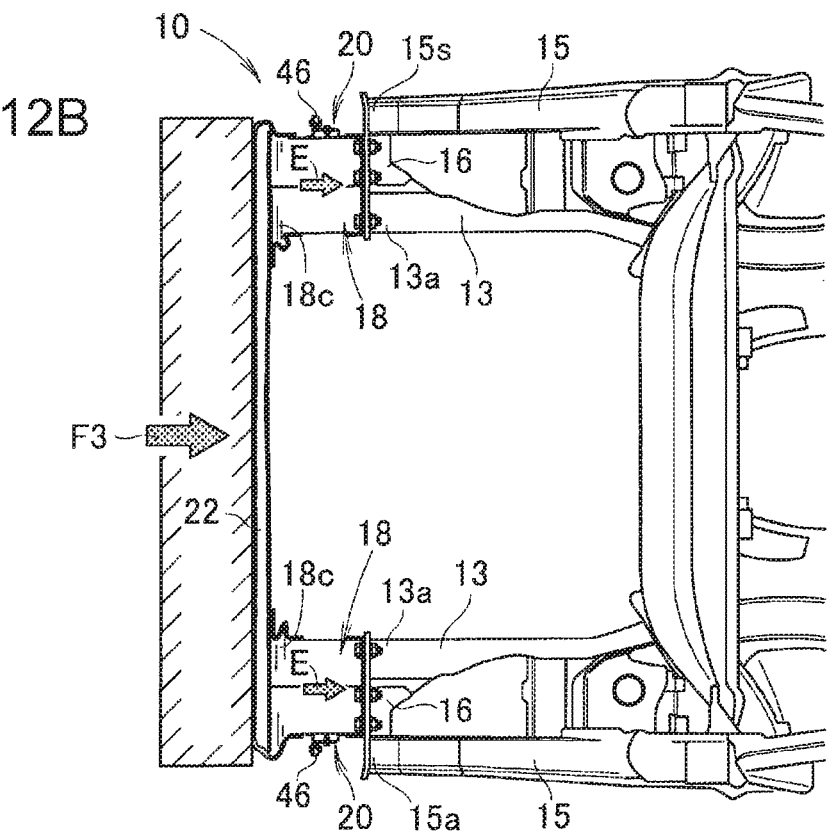
Figure 13:
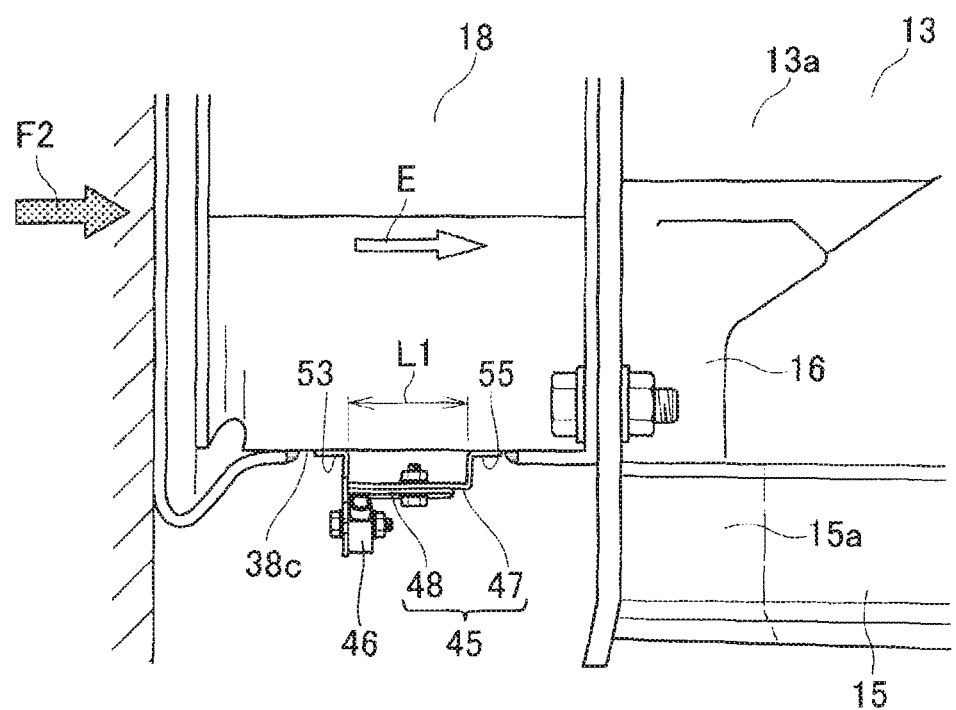
FIG. 13 is an explanatory diagram to explain an example of early detection of collision information by an airbag sensor attachment structure according to the embodiment of the present disclosure in a high speed frontal collision.

Next, with reference to FIG. 12A, FIG. 12B, and FIG. 13, explanation follows regarding an example in which the airbag is deployed due to an impact load F3 input when the impact load F3 is input in a high speed frontal collision to the vehicle body front section structure 10 (namely, in a high speed region sufficient to fully crush the left bumper beam extension 18 or the right bumper beam extension 18 over its entire range).

Note that FIG. 13 illustrates the left side members and omits the right side members in order to facilitate understanding of the operation.

As illustrated in FIG. 12A, the impact load F3 is input to the bumper beam 22 of the vehicle body front section structure 10 by the high speed frontal collision. The bumper beam 22 undergoes bending and crushing deformation due to the impact load F3 being input to the bumper beam 22. Moreover, the leading end portion 18c of the left bumper beam extension 18 and the leading end portion 18c of the right bumper beam extension 18 also deform.

As illustrated in FIG. 12B, the front portion 15a of the left upper member 15 is coupled to the front portion 13a of the left front side frame 13 by the left coupling section 16. Moreover, the left bumper beam extension 18 is provided at the front end 13b of the left front side frame 13 and at the front end 16c of the left coupling section 16.

Accordingly, the impact load F3 can be supported by both the left front side frame 13 and the left upper member 15 in a high speed frontal collision. This thereby enables the entire region of the left bumper beam extension 18 to undergo sufficient compression (namely, axial crushing) toward the vehicle body rear due to the impact load F3, as illustrated by arrow E.

As illustrated in FIG. 13, the front joining portion 53 and the rear joining portion 55 of the stay 47 are provided to the outside face 38c of the left bumper beam extension 18 at the spacing L1 in the vehicle body front-rear direction. Accordingly, the front joining portion 53 of the stay 47 can be moved toward the vehicle body rear, as illustrated by arrow E, when the left bumper beam extension 18 is compressed toward the vehicle body rear in a high speed frontal collision, as illustrated by arrow E.

Accordingly, there is no concern of compression (crushing defamation) of the left bumper beam extension 18 being obstructed by the stay 47. This thereby enables stable compression of the left bumper beam extension 18 toward the vehicle body rear as illustrated by arrow E, and enables stable defamation of the left front side frame 13.

In this manner, the entire range of the left bumper beam extension 18 is sufficiently compressed by the impact load F3, thereby enabling a sufficient energy absorption amount with respect to the impact load F3 to be secured.

Note that during compression of the left bumper beam extension 18, the support section 45 (specifically, the stay 47 and the bracket 48) can be deformed toward the vehicle body rear in response to this compression, as illustrated by arrow E. This thereby enables the airbag sensor 46 to be made to retreat toward the vehicle body rear together with the bracket 48, as illustrated by the arrow E.

This thereby enables collision information of the high speed frontal collision to be detected precisely and at an early stage by the airbag sensor 46. This thereby enables the airbag to be deployed in an initial stage of the high speed frontal collision.

Note that similarly to in a high speed frontal collision, in a small overlap collision sufficient to fully crush the left bumper beam extension 18 over its entire range, impact load can be supported by both the left front side frame 13 and the left upper member 15. Moreover, the front joining portion 53 of the stay 47 can be moved toward the vehicle body rear by the impact load.

Accordingly, the left bumper beam extension 18 can be sufficiently compressed over its entire range by the impact load, thereby enabling a sufficient energy absorption amount with respect to the impact load to be secured.

The airbag sensor 46 can be made to retreat toward the vehicle body rear since the left bumper beam extension 18 is sufficiently compressed by the impact load. Similarly to in a high speed frontal collision, this enables collision information to be detected precisely and at an early stage by the airbag sensor 46 in a small overlap collision, enabling the airbag to be deployed in an initial stage of the collision.

Note that the airbag sensor attachment structure according to the present disclosure is not limited to the above embodiment, and may be modified and improved on as appropriate.

For example, in the above embodiment, explanation has been given regarding an example in which the coupling plate 25, the first shock absorbing member 26, and the second shock absorbing member 27 are lightweight metal members configured by an aluminum alloy or the like. However, there is no limitation thereto.

For example, the coupling plate 25, the first shock absorbing member 26, and the second shock absorbing member 27 may be formed from sheet steel. In such a configuration, the coupling plate 25 and the left coupling section 16 are joined together by MIG welding, and the coupling plate 25 and the second shock absorbing member 27 are joined together by MIG welding.

Moreover, in the above embodiment, explanation has been given regarding an example in which the sensor attachment structure 20 is provided to the outside face 38c of the external face 38 of the left bumper beam extension 18. However, there is no limitation thereto. For example, the sensor attachment structure 20 may be provided to the upper face 38a, the inside face 38b, or the lower face 38d of the external face 38 of the left bumper beam extension 18.

Moreover, in the above embodiment, explanation has been given regarding an example in which the attachment base portion 56 of the bracket 48 is attached to the apex portion 51 of the stay 47 by the bolt 61 and the nut 62. However, there is no limitation thereto, and attachment may be performed using other fastening members, such as rivets.

Moreover, in the above embodiment, explanation has been given regarding an example in which the flange 58 is formed so as to be continuous to the lower ends 48a of the bracket 48. However, there is no limitation thereto, and a flange may be formed so as to be continuous to the upper end 48b of the bracket 48.

Moreover, in the above embodiment, explanation has been given regarding an example in which the connector protector 59 protrudes out from the upper end 57a of the projecting portion 57; however, there is no limitation thereto. For example, in a configuration in which the wire harness 67 extends downward from the airbag sensor 46, the connector protector 59 may protrude out from a lower end of the projecting portion 57 so as to follow the wire harness 67.

Moreover, there is no limitation to the shapes and configurations of the vehicle body front section structure, the vehicle body, the left and right front side frames, the left and right upper members, the left and right coupling sections, the left and right bumper beam extensions, the sensor attachment structure, the bumper beam, the beam rear wall, the airbag sensor, the stay, the bracket, the apex portion, the front joining portion, the rear joining portion, the attachment base portion, the projecting portion, the flange, the connector protector, or the bend portion. These may be modified as appropriate.

The present disclosure is preferably applied to an automobile provided with an airbag sensor attachment structure in which an airbag sensor is attached at the vehicle body front of a front side frame. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

We claim:

1. An airbag sensor attachment structure for attachment to a vehicle body front section structure comprising a front side frame extending in a vehicle body front-rear direction and a bumper beam extension extending out from a front end of the front side frame toward the vehicle body front at respective front side sections of a vehicle body, and a bumper beam provided at a front end of the bumper beam extension, the airbag sensor attachment structure comprising:
   a support member that is provided to an external face of the bumper beam extension, and that moves toward the vehicle body rear in accordance with compression of the bumper beam extension during compression of the bumper beam extension due to an impact load input from the vehicle body front; and
   an airbag sensor that is attached to the support member, wherein the support member includes:
   a stay that includes a front joining portion and a rear joining portion provided on the external face of the bumper beam extension, and a substantially u-shape portion connected to and protruding from the front joining portion and the rear joining portion, the front joining portion, the rear joining portion and the substantially u-shape portion makes a substantially hat-shape in plan view; and
   a bracket that includes an attachment base portion provided to a top portion of the substantially u-shape portion of the stay, the top portion being separated away from the external face of the bumper beam extension, and a projecting portion projecting from the attachment base portion and to which the airbag sensor is attached,
   wherein the projecting portion and the attachment base portion makes a substantially L-shape in plan view.

2. The airbag sensor attachment structure of claim 1, wherein the bracket is formed by plate steel.

3. The airbag sensor attachment structure of claim 2, wherein:
   the bumper beam extension and the stay are formed by an aluminum alloy;
   the bracket is fastened to the stay by a fastening member; and
   the fastening member is coated with galvanic corrosion resistant coating.

4. The airbag sensor attachment structure of claim 1, wherein:
   the bumper beam has a hollow cross-section, and a rear portion at respective longitudinal end portions of the bumper beam is fixed to the front end of the bumper beam extension; and
   the bumper beam extension has strength and rigidity against a light collision.

5. The airbag sensor attachment structure of claim 1, wherein:
   the bumper beam has a hollow cross-section, and a rear portion at respective longitudinal end portions of the bumper beam is fixed to the front end of the bumper beam extension;
   the bumper beam extension has rigidity against a light collision; and
   the front joining portion and the rear joining portion of the stay are provided on the external face of the bumper beam extension with a space therebetween in the vehicle body front-rear direction.

6. The airbag sensor attachment structure of claim 1, wherein the bracket includes:
   a flange that is disposed at an upper end or a lower end of the bracket so as to be continuous to the attachment base portion, the projecting portion, and a bend portion where the attachment base portion and the projecting portion intersect; and
   a connector protector that protrudes out from the upper end or the lower end of the bracket.

7. The airbag sensor attachment structure of claim 1, wherein:
   a left side airbag sensor of the airbag sensor is attached to a left side bumper beam extension of the bumper beam extension, and a right side airbag sensor of the airbag sensor is attached to a right side bumper beam extension of the bumper beam extension; and
   the left side airbag sensor and the right side airbag sensor are inclined such that a distance from the left side airbag sensor to a vehicle body center, and a distance from the right side airbag sensor to the vehicle body center, are equal to each other.

8. The airbag sensor attachment structure of claim 7, wherein the left side airbag sensor and the right side airbag sensor are inclined toward the vehicle body center.

9. The airbag sensor attachment structure of claim 1, wherein the bumper beam extension has a substantially rectangular shaped external cross-section, has a width dimension larger than a height dimension, and is internally partitioned into a plurality of closed cross-sections.

10. The airbag sensor attachment structure of claim 9, wherein the bumper beam extension is partitioned by a partition extending in the vehicle body front-rear direction.

11. The airbag sensor attachment structure of claim 1, further comprising:
    an upper member provided on a vehicle width direction outside of the front side frame; and
    a coupling section that couples a front portion of the upper member and a front portion of the front side frame together, wherein
    the bumper beam extension is provided at the front end of the front side frame and at a front end of the coupling section.

12. The airbag sensor attachment structure of claim 1, wherein the external surface of the bumper beam extension is an external surface extending in the vehicle body front-rear direction.

13. The airbag sensor attachment structure of claim 12, wherein the external surface of the bumper beam extension is an outer side face in a vehicle width direction.

14. The airbag sensor attachment structure of claim 1, wherein the substantially u-shape portion protrudes in a vehicle width direction, and the projecting portion of the bracket projects in the vehicle width direction.

15. The airbag sensor attachment structure of claim 14, wherein the projecting portion is disposed at a front end of the attachment base portion with a bending portion therebetween.

16. The airbag sensor attachment structure of claim 15, wherein the projecting portion has a plate shape including a rear surface facing the vehicle body rear, and
    the airbag sensor is attached to the rear surface.

17. A vehicle comprising the airbag sensor attachment structure of claim 1.

18. An airbag sensor attachment structure for attachment to a vehicle body front section structure comprising a front side frame extending in a vehicle body front-rear direction and a bumper beam extension extending out from a front end of the front side frame toward the vehicle body front at respective front side sections of a vehicle body, and a bumper beam provided at a front end of the bumper beam extension, the airbag sensor attachment structure comprising:
    a support member that is provided to an external face of the bumper beam extension, and that moves toward the vehicle body rear in accordance with compression of the bumper beam extension during compression of the bumper beam extension due to an impact load input from the vehicle body front; and
    an airbag sensor that is attached to the support member, wherein the external surface of the bumper beam extension is an external surface extending in the vehicle body front-rear direction, and
    wherein the external surface of the bumper beam extension is an outer side face in a vehicle width direction.

* * * * *